United States Patent
Tsutsumi

(10) Patent No.: US 9,076,214 B2
(45) Date of Patent: Jul. 7, 2015

(54) IMAGE ACQUISITION APPARATUS AND IMAGE PROCESSING APPARATUS USING SELECTED IN-FOCUS IMAGE DATA

(75) Inventor: Shohei Tsutsumi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 383 days.

(21) Appl. No.: 13/567,198

(22) Filed: Aug. 6, 2012

(65) Prior Publication Data

US 2013/0038723 A1 Feb. 14, 2013

(30) Foreign Application Priority Data

Aug. 11, 2011 (JP) ................................. 2011-176117

(51) Int. Cl.
*H04N 7/18* (2006.01)
*G06T 7/00* (2006.01)
*G01S 5/16* (2006.01)
*H04N 5/225* (2006.01)
*H04N 5/232* (2006.01)

(52) U.S. Cl.
CPC ................ *G06T 7/0075* (2013.01); *G01S 5/16* (2013.01); *H04N 5/2258* (2013.01); *H04N 5/23212* (2013.01); *G06T 2207/10012* (2013.01); *G06T 2207/10024* (2013.01)

(58) Field of Classification Search
CPC .......................... H04N 5/2258; H04N 5/23212
USPC .......................................................... 348/139
See application file for complete search history.

(56) References Cited

U.S. PATENT DOCUMENTS

| | | | | |
|---|---|---|---|---|
| 4,928,175 A | * | 5/1990 | Haggren ........................ | 348/159 |
| 5,793,900 A | * | 8/1998 | Nourbakhsh et al. ......... | 382/263 |
| 5,917,937 A | * | 6/1999 | Szeliski et al. ................. | 382/154 |
| 6,674,461 B1 | * | 1/2004 | Klapman ......................... | 348/42 |
| 7,015,954 B1 | * | 3/2006 | Foote et al. .................. | 348/218.1 |
| 7,986,343 B2 | * | 7/2011 | Kumagai et al. ........... | 348/208.13 |
| 2002/0118286 A1 | * | 8/2002 | Kanade et al. .............. | 348/222.1 |
| 2002/0118969 A1 | * | 8/2002 | Kanade et al. ................ | 396/322 |
| 2002/0145660 A1 | * | 10/2002 | Kanade et al. .................. | 348/36 |
| 2003/0052971 A1 | * | 3/2003 | Gutta et al. .................... | 348/159 |
| 2003/0076413 A1 | * | 4/2003 | Kanade et al. ................. | 348/139 |
| 2003/0210329 A1 | * | 11/2003 | Aagaard et al. ................ | 348/159 |
| 2004/0240052 A1 | * | 12/2004 | Minefuji et al. .............. | 359/435 |
| 2007/0285559 A1 | * | 12/2007 | Perlman et al. ............... | 348/371 |
| 2008/0239135 A1 | * | 10/2008 | Tamura ......................... | 348/335 |
| 2011/0211068 A1 | * | 9/2011 | Yokota ........................... | 348/139 |
| 2012/0236168 A1 | * | 9/2012 | Tsutsumi .................... | 348/208.4 |
| 2013/0063614 A1 | * | 3/2013 | Tsutsumi .................... | 348/208.4 |

FOREIGN PATENT DOCUMENTS

| | | |
|---|---|---|
| JP | 2000-236434 A | 8/2000 |
| JP | 2007-158825 A | 6/2007 |
| JP | 2008-196891 A | 8/2008 |
| JP | 2009-216600 A | 9/2009 |
| JP | 2011-117787 A | 6/2011 |
| JP | 2011-149931 A | 8/2011 |

* cited by examiner

*Primary Examiner* — Usman Khan

(74) *Attorney, Agent, or Firm* — Fitzpatrick, Cella, Harper & Scinto

(57) ABSTRACT

An image acquisition apparatus according to the present invention includes a first image capturing unit group including a plurality of image capturing units in which at least part of in-focus distance ranges overlap each other and a second image capturing unit group including a plurality of image capturing units in which at least part of in-focus distance ranges overlap each other. The second image capturing unit group is different from the first image capturing unit group. A first object distance to an object is obtained from image data acquired by the first image capturing unit group and a second object distance different from the first object distance is obtained from image data acquired by the second image capturing unit group.

10 Claims, 31 Drawing Sheets

```
WHEN m = 0, n IS 1 TO 8
WHEN m = 1, n IS 2 TO 8
WHEN m = 2, n IS 3 TO 8
WHEN m = 3, n IS 4 TO 8
WHEN m = 4, n IS 5 TO 8
WHEN m = 5, n IS 6 TO 8
WHEN m = 6, n IS 7 TO 8
WHEN m = 7, n IS 8
```

CONTRAST VALUES IN DIVIDED AREAS

|  | A | B | C |
|---|---|---|---|
| IMAGE CAPTURING UNIT 101 | 0.783 | 0.536 | 0.565 |
| IMAGE CAPTURING UNIT 102 | 0.333 | 0.697 | 0.571 |
| IMAGE CAPTURING UNIT 103 | 0.552 | 0.481 | 0.683 |
| IMAGE CAPTURING UNIT 104 | 0.556 | 0.485 | 0.333 |
| IMAGE CAPTURING UNIT 105 | 0.714 | 0.340 | 0.283 |
| IMAGE CAPTURING UNIT 106 | 0.560 | 0.694 | 0.489 |
| IMAGE CAPTURING UNIT 107 | 0.585 | 0.540 | 0.569 |
| IMAGE CAPTURING UNIT 108 | 0.340 | 0.576 | 0.701 |
| IMAGE CAPTURING UNIT 109 | 0.575 | 0.544 | 0.750 |

| | FOCUS POSITION (m) | DEPTH OF FIELD (m) | |
|---|---|---|---|
| | | FRONT | REAR |
| IMAGE CAPTURING UNIT 101 | 1.00 | 0.85 | 1.21 |
| IMAGE CAPTURING UNIT 102 | 1.21 | 1.00 | 1.54 |
| IMAGE CAPTURING UNIT 103 | 1.54 | 1.21 | 2.12 |
| IMAGE CAPTURING UNIT 104 | 2.12 | 1.54 | 3.39 |
| IMAGE CAPTURING UNIT 105 | 3.39 | 2.12 | 8.45 |
| IMAGE CAPTURING UNIT 106 | 1.00 | 0.85 | 1.21 |
| IMAGE CAPTURING UNIT 107 | 1.21 | 1.00 | 1.54 |
| IMAGE CAPTURING UNIT 108 | 1.54 | 1.21 | 2.12 |
| IMAGE CAPTURING UNIT 109 | 2.12 | 1.54 | 3.39 |

FIG.29

DIAGRAM OF IMAGE CAPTURING
UNIT AS SEEN FROM SIDE

DIAGRAM OF IMAGE CAPTURING
UNIT AS SEEN FROM FRONT

IMAGE ACQUISITION APPARATUS AND IMAGE PROCESSING APPARATUS USING SELECTED IN-FOCUS IMAGE DATA

BACKGROUND OF THE INVENTION

1. Field of the Invention

The present invention relates to an image processing apparatus, and a image acquisition apparatus for providing a range image based on an image group acquired by a camera array image capturing device.

2. Description of the Related Art

Conventionally, there is a distance measurement apparatus which measures a distance between an object and a camera on the basis of a plurality of images which are captured from different viewpoints by using a plurality of optical systems. As a method for measuring a distance between an object and a camera, a stereo matching process which is based on a correlation between images and which uses a plurality of images having parallax that are captured by a stereo camera, is known. Further, Japanese Patent Laid-Open No. 2008-196891 discloses a camera array stereo matching process which measures a distance using three or more images captured from different viewpoints in order to improve distance measurement accuracy.

As another distance measuring method, a method for measuring a distance between a main object and a camera by a so-called contrast method which measures the distance on the basis of a plurality of object images captured by shifting the focus position is known. A method for measuring a distance between a main object and a camera, which is extended from the above method to a camera array method including a plurality of optical systems, is disclosed by Japanese Patent Laid-Open No. 2009-216600. In this method, a distance to the main object is measured by the contrast method based on a plurality of object images captured by an image capturing apparatus including a plurality of optical systems having different focus positions. Compared with a method for acquiring a plurality of object images while changing the focus position by using a single-view image capturing apparatus, the method of Patent Document 2 using the camera array method has an advantage that a plurality of object images having different focus positions can be acquired by one-time image capturing.

However, the method proposed by Japanese Patent Laid-Open No. 2008-196891 has problems that (1) the resolution of a distance map decreases in an image area different from the focus position and (2) the accuracy of distance estimation degrades when the depth of field is increased. Regarding the former problem, although a substantially focused image is obtained by driving a lens to adjust the focus position when the object is located at a distant place, when the object is located at a nearby place, the image is out of focus and an image with a low resolution is captured. If a distance is measured based on such an image out of focus, the resolution of an obtained range image decreases. Regarding the latter problem, although it can be considered to reduce the lens diameter to increase the depth of field of the image capturing system and capture a all-focused image, if the lens diameter is reduced, the amount of incident light to the lens decreases and noise included in a captured image increases. If a distance is measured based on an image including a lot of noise, there is a problem that the accuracy of distance estimation degrades.

The method proposed by Japanese Patent Laid-Open No. 2009-216600 is limited to measurement of distance to the main object, and if there is a background in a position different from the main object, there is a problem that distance measurement of an entire image including the main object and the background cannot be realized.

SUMMARY OF THE INVENTION

To solve the above problems, an image acquisition apparatus according to the present invention includes a first image capturing unit group including a plurality of image capturing units in which at least part of in-focus distance ranges overlap each other and a second image capturing unit group including a plurality of image capturing units in which at least part of in-focus distance ranges overlap each other. The second image capturing unit group is different from the first image capturing unit group. A first object distance to an object is obtained from image data acquired by the first image capturing unit group and a second object distance different from the first object distance is obtained from image data acquired by the second image capturing unit group.

The present invention has an effect to provide a range image including a main object and a background from an image group acquired by a camera array image capturing device.

Further features of the present invention will become apparent from the following description of exemplary embodiments with reference to the attached drawings.

BRIEF DESCRIPTION OF THE DRAWINGS

FIG. 29 is a diagram showing an example of the focus position of image capturing and the front and rear depths of field;

DESCRIPTION OF THE EMBODIMENTS (First Embodiment)

Figure 1:
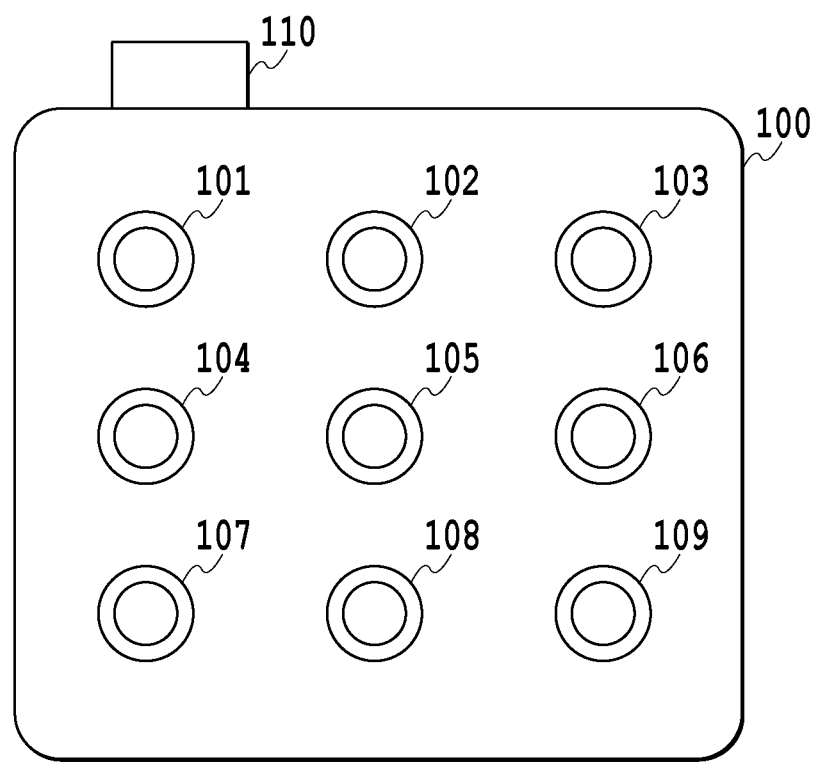
FIG. 1 is a diagram showing an example of a camera array image capturing device including a plurality of image capturing units.

FIG. 1 is a diagram showing an example of a camera array image capturing device including a plurality of image capturing units. Reference numeral 100 denotes a housing of the image capturing apparatus. The housing 100 includes nine image capturing units 101 to 109 that acquire a color image and an image capturing button 110. The nine image capturing units are uniformly arranged in a square lattice shape. When a user presses the image capturing button 110, light information of an object received by sensors (image capturing devices) included in the image capturing unit 101 to 109 is A/D converted and a plurality of color images (digital data) can be acquired at the same time. By using such a camera array image capturing device, a color image group obtained by capturing images of the same object from a plurality of viewpoints can be obtained.

Although, here, the number of the image capturing units is nine, the number of the image capturing units is not limited to nine. The present invention can be applied as long as the image capturing apparatus includes a plurality of image capturing units.

Although, here, an example in which nine image capturing units are uniformly arranged in a square lattice shape is described, the image capturing units can be arranged arbitrarily. For example, the nine image capturing units may be arranged radially or linearly or may be arranged at random.

Figure 2:
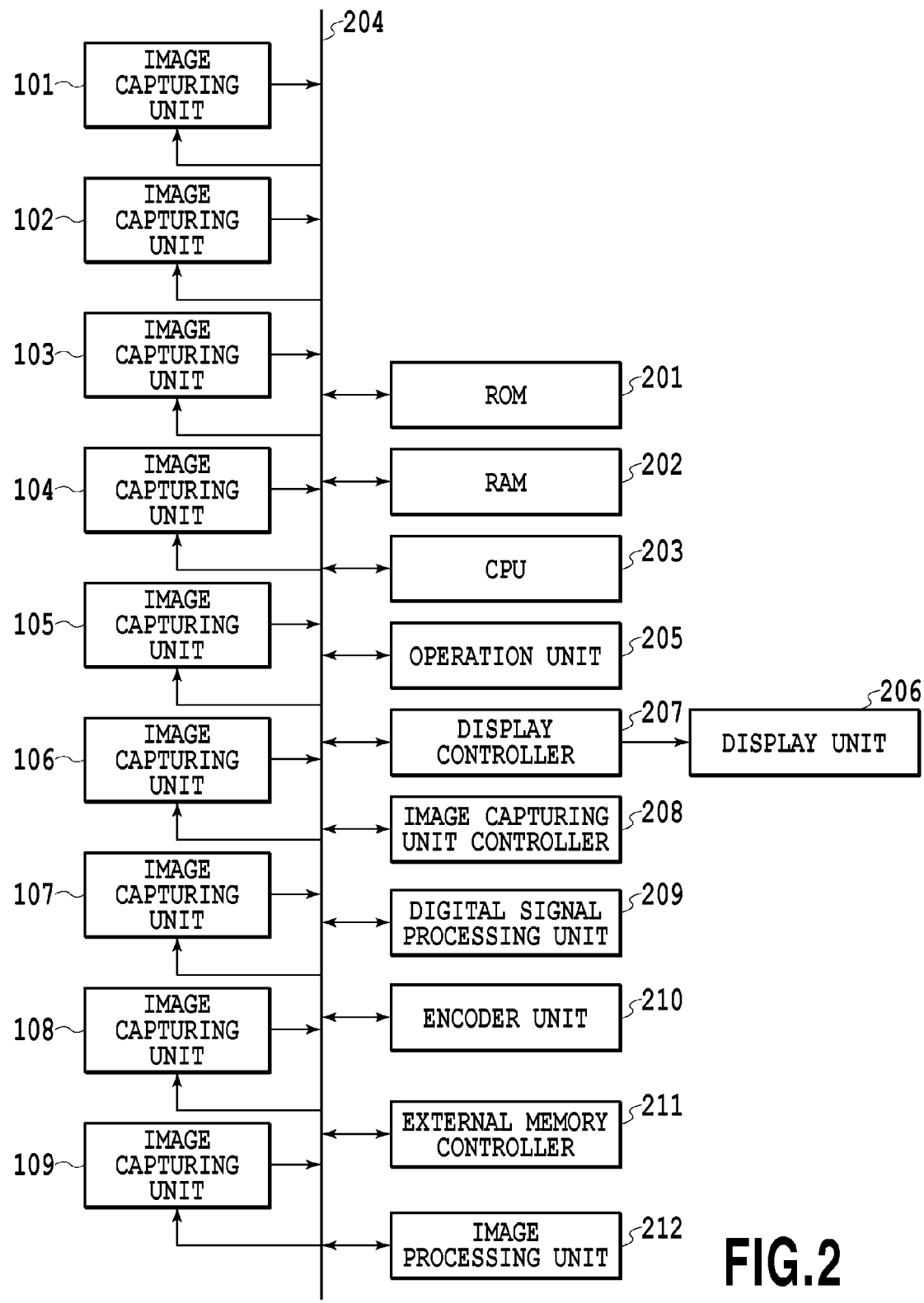
FIG. 2 is a block diagram showing an internal configuration of the camera array image capturing device.

FIG. 2 is a block diagram showing an internal configuration of the image capturing apparatus 100. A CPU 201 is a central processing unit (CPU) and integrally controls units described below.

A RAM 202 functions as a main memory and a work area and the like for the CPU 201.

A ROM 203 stores a control program and the like which is executed by the CPU 201.

A bus 204 functions as a transfer path of various data. For example, digital data acquired by the image capturing units 101 to 109 is transmitted to a predetermined processing unit through the bus 204.

An operation unit 205 includes a button, a mode dial, and the like and receives a user's instruction.

A display unit 206 is, for example, a liquid crystal display and displays a captured image or characters. The display unit 206 may include a touch screen function. In this case, a user instruction input from the touch screen can be used as input from the operation unit 205.

A display controller 207 performs display control to cause the display unit 206 to display a captured image and characters.

An image capturing unit controller 208 controls an image capturing system based on an instruction from the CPU 201, such as focusing on an object, opening or closing a shutter to capture an image, and adjusting an aperture.

A digital signal processing unit 209 performs various processes, such as a white balance process, a gamma process, and a noise reduction process, on digital data received through the bus 204.

An encoder unit 210 performs a process for converting digital data into a file format of JPEG, MPEG, and the like.

An external memory controller 211 is an interface for connecting to a PC and other media (for example, hard disk, memory card, CF card, SD card, and USB memory).

An image processing unit 212 performs a process for calculating a distance from a color image group acquired by the image capturing units 101 to 109 or a color image group output from the signal processing unit 208. The details of the image processing unit 212 will be described later.

Although the image capturing apparatus includes constituent elements other than those described above, they are not major components of the present invention, so that the description thereof will be omitted.

Figure 3A:
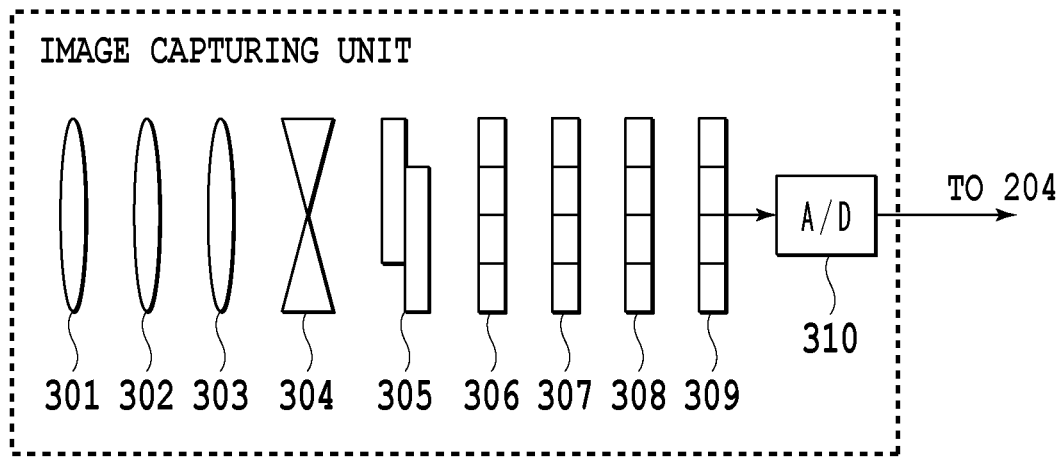
FIGS. 3A and 3B are diagrams showing an internal configuration of the image capturing unit.

FIG. 3A is a diagram showing an internal configuration of the image capturing units 101 to 109. Each of the image capturing units 101 to 109 includes lenses 301 to 303, an aperture 304, a shutter 305, an optical low pass filter 306, an iR cut filter 307, a color filter 308, a sensor 309, and an A/D converter 310. More specifically, the lenses 301 to 303 are a zoom lens 301, a focus lens 302, and a camera shake correction lens 303. The focus lens of each of the image capturing units 101 to 109 is placed at a different position in an optical system for each image capturing unit. Therefore, the focus lenses are set so that the focus distances of the image capturing units are different from each other. The sensor 309 is, for example, a CMOS sensor, a CCD sensor, or the like. When the sensor 309 detects an amount of light of an object, the detected amount of light is converted into a digital value by the A/D conversion unit 310 and output to the bus 204 as digital data.

Figure 3B:
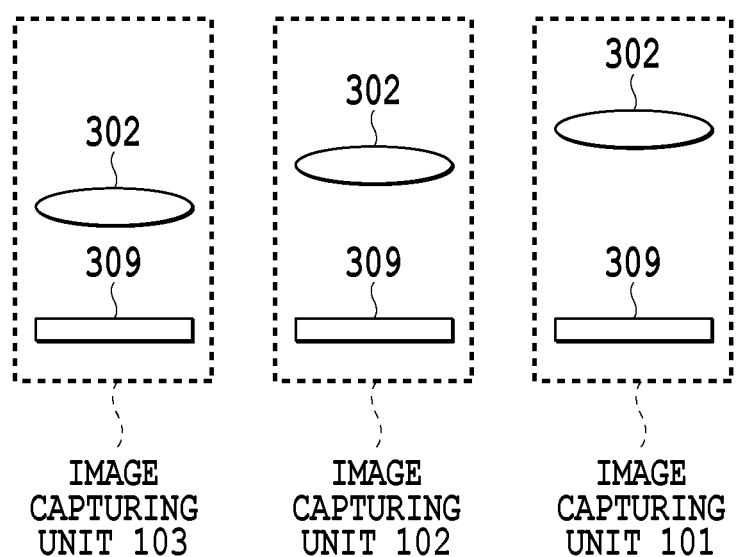

FIG. 3B shows an example of the positions at which the focus lenses 302 are arranged in the image capturing units 101 to 103. The focus lens in the image capturing unit 101 is disposed at a position far from the sensor 309. On the other hand, the focus lens in the image capturing unit 103 is disposed at a position near to the sensor 309. The focus lenses in the image capturing units 104 to 109 not shown in FIG. 3B are also disposed at positions different from each other.

Figure 23:
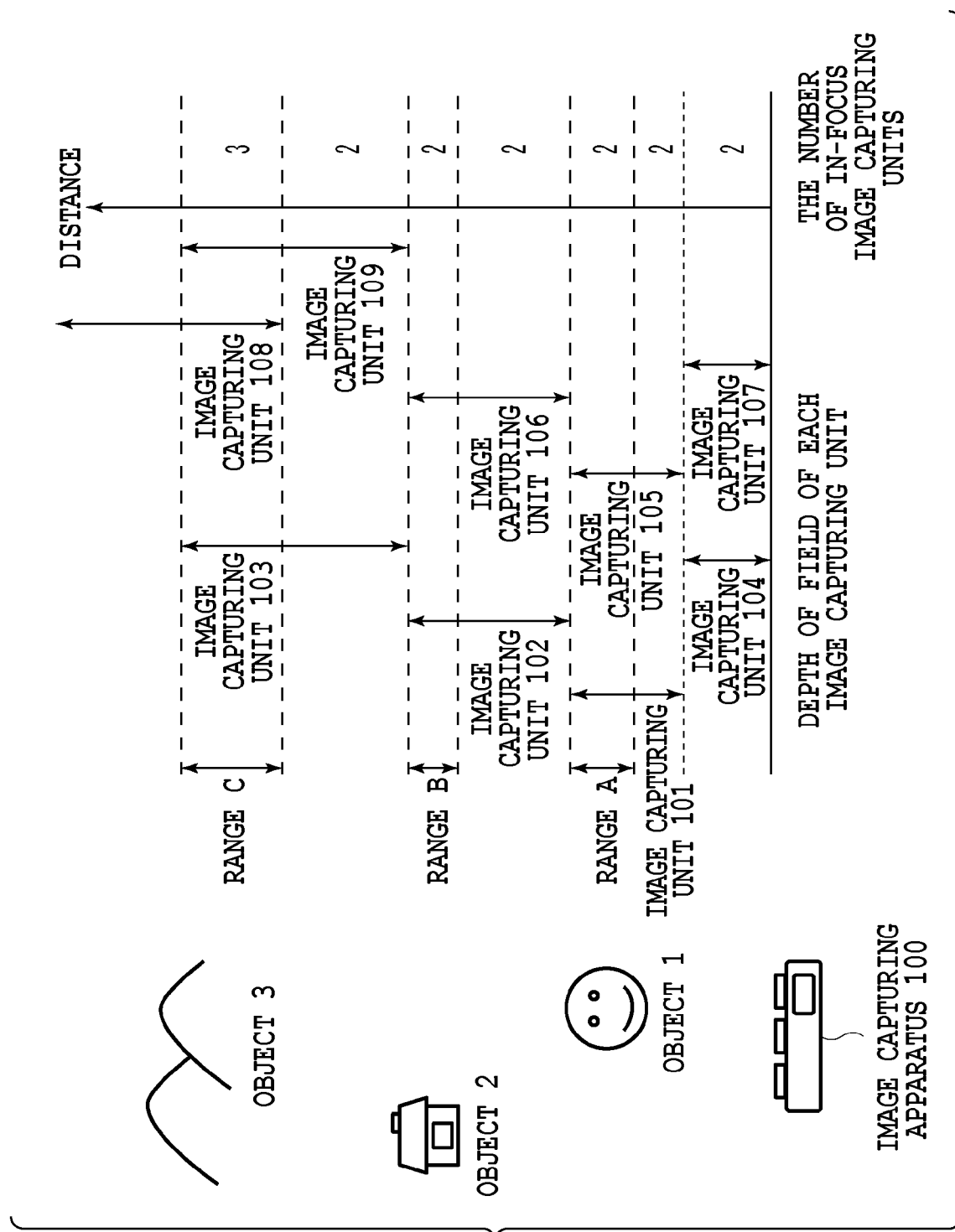
FIG. 23 is a diagram showing an example of a range of the depth of field of the image capturing unit.

FIG. 23 shows an example of ranges of the depth of field (ranges in which an object is in-focus) of the image capturing units 101 to 109 whose focus distances are different from each other.

The left side of FIG. 23 shows a relationship between the image capturing apparatus 100 and the objects. FIG. 23 is a diagram for explaining a case in which three types of objects (object 1, object 2, and object 3) are respectively located at different positions from the image capturing apparatus. As shown in FIG. 23, the object 1 is located at a position nearest to the image capturing unit and the object 3 is located at a position farthest from the image capturing unit.

The right side of FIG. 23 shows the ranges of the depth of field of the image capturing units and the number of image capturing units that are in a range of the depth of field at each distance. For example, the focus positions of the image capturing units 101 and 105 are set so that a range A in which the object 1 is located is included in the depths of field of the image capturing units 101 and 105. Also, the focus positions of the image capturing units 102 and 106 are set so that a range B in which the object 2 is located is included in the depths of field of the image capturing units 102 and 106. Also, the focus positions of the image capturing units 103, 108, and 109 are set so that a range C in which the object 3 is located is included in the depths of field of the image capturing units 103, 108, and 109.

In the present embodiment, the focus positions of the image capturing units are set so that the depths of field of at least two image capturing units overlap each other at any distance from the image capturing unit to the object. As shown in FIG. 23, it is not necessary to set the focus positions of all the image capturing units to be different from each other. In other words, the focus positions of a plurality of image capturing units may be coincident with each other.

<Configuration Diagram of Image Processing Unit>

Figure 4:
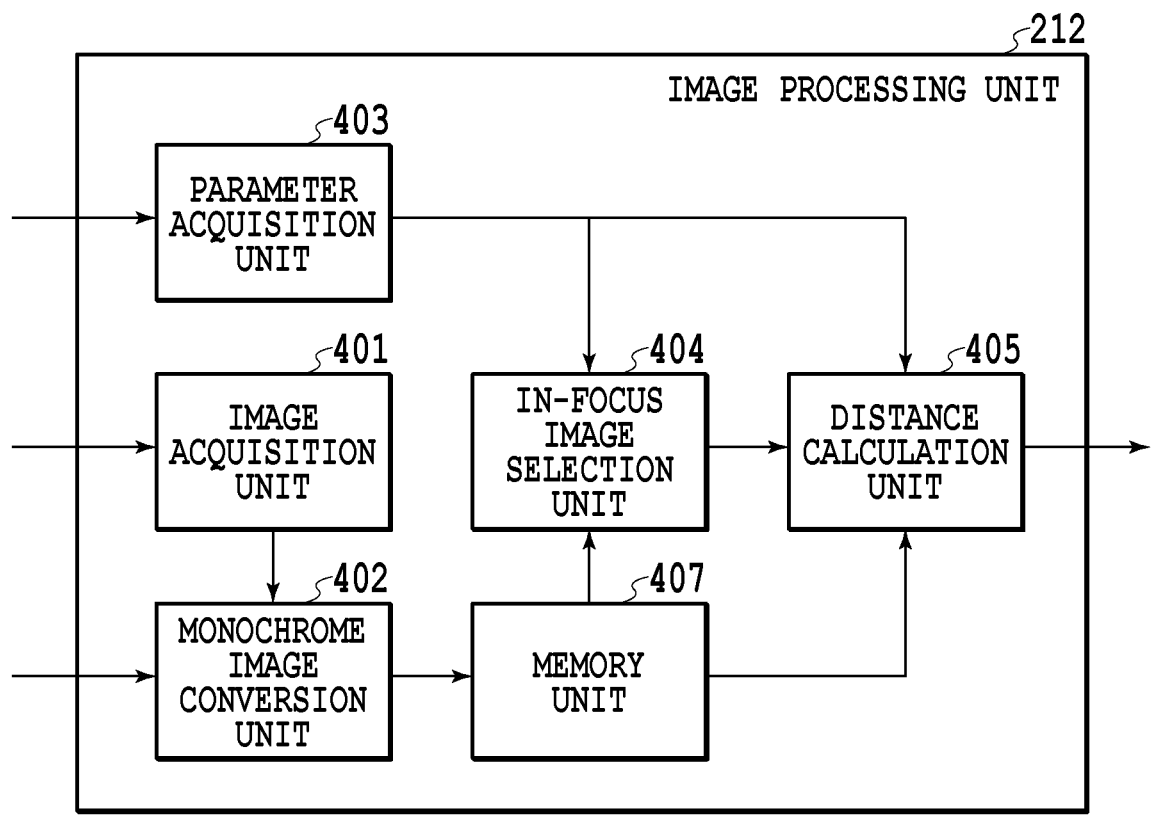
FIG. 4 is a block diagram showing an internal configuration of an image processing unit according to a first embodiment.

FIG. 4 is a block diagram showing an internal configuration of the image processing unit 212.

An image acquisition unit 401 acquires a color image group supplied from the image capturing units 101 to 109 through the bus 204. A monochrome conversion unit 402 converts the color image group supplied from the image acquisition unit 401 into a monochrome image group. A memory unit 407 temporarily stores the monochrome image group supplied from the monochrome image conversion unit 402. A parameter acquisition unit 403 acquires various parameters of the image capturing units 101 to 109 when an image is captured. The parameters include, for example, a focal length of the image capturing unit, an aperture value (F number), a sensor size, the number of pixels of the sensor, a focus length (a distance between a main lens and the sensor), a relative position between the image capturing units, and the like. An in-focus image selection unit 404 selects a focused (hereinafter referred to as "in-focus") image from monochrome images stored in the memory unit 407 by using parameters supplied from the parameter acquisition unit 403. The details of the in-focus image selection unit 404 will be described later. A distance calculation unit 405 calculates a distance to the object by using parameters supplied from the parameter acquisition unit 403, an image determined to be in focus by the in-focus image selection unit 404, and monochrome images stored in the memory unit 407 and outputs the distance. The details of the distance calculation unit 405 will be described later.

Next, the details of image processing performed by the units 401 to 407 included in the image processing unit 212 will be described.

Figure 5:
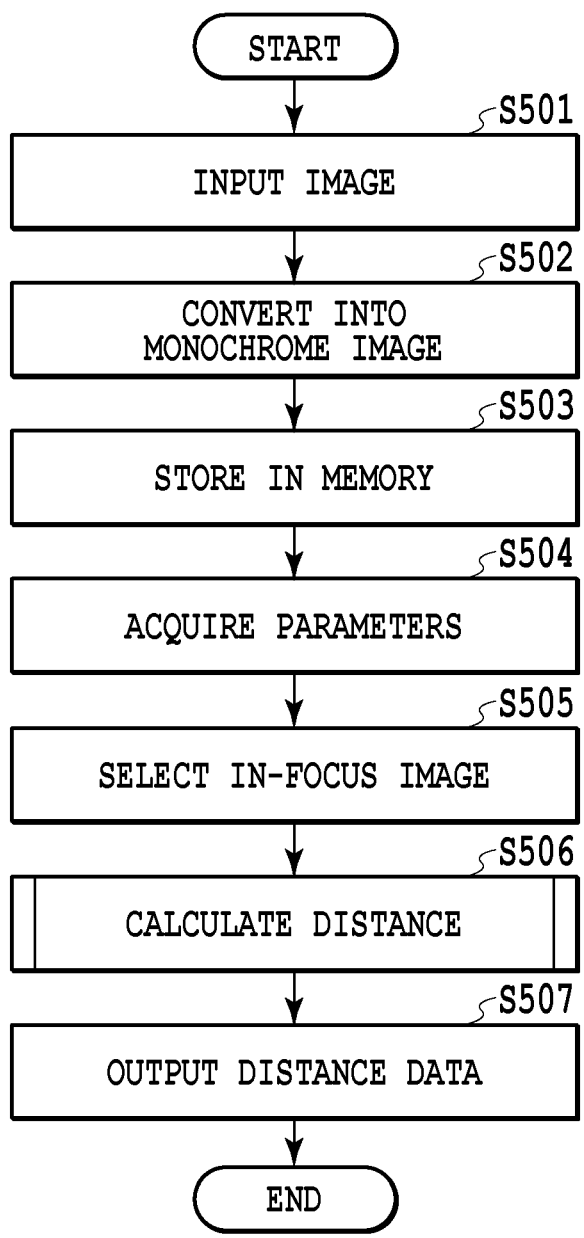
FIG. 5 is a flowchart showing a process flow in the image processing unit according to the first embodiment.

FIG. 5 is a flowchart showing a flow of the image processing by the image processing unit 212.

In step 501, the image acquisition unit 401 acquires color images from the image capturing units 101 to 109. In the present embodiment, there are nine image capturing units, so that nine color images, which are digital data, are input.

In step 502, the monochrome image conversion unit 402 converts an input color image into a monochrome image. In step 502, RGB values of each pixel of the color image are converted into brightness values corresponding to the RGB values.

In step 503, the memory unit 407 stores the monochrome image converted by the monochrome image conversion unit 402 and temporarily holds the monochrome image.

In step 504, the parameter acquisition unit 403 acquires parameters related to the image capturing units 101 to 109.

In step 505, the in-focus image selection unit 404 selects an in-focus image from monochrome images supplied from the monochrome image conversion unit 402 by using the acquired parameters.

In step 506, the distance calculation unit 405 calculates a distance to the object by using acquired parameters and the monochrome image which is determined to be in focus.

Finally, in step 507, distance data generated by the distance calculation unit 405 is output and the image processing is completed.

As described above, the image processing is performed by the image processing unit 212, so that it is possible to provide an accurate range image.

Next, the details of the selection process of the in-focus image (S505) and the distance calculation process (S506) will be described in order.

<Configuration Diagram of In-Focus Image Selection Unit 404>

Figure 6:
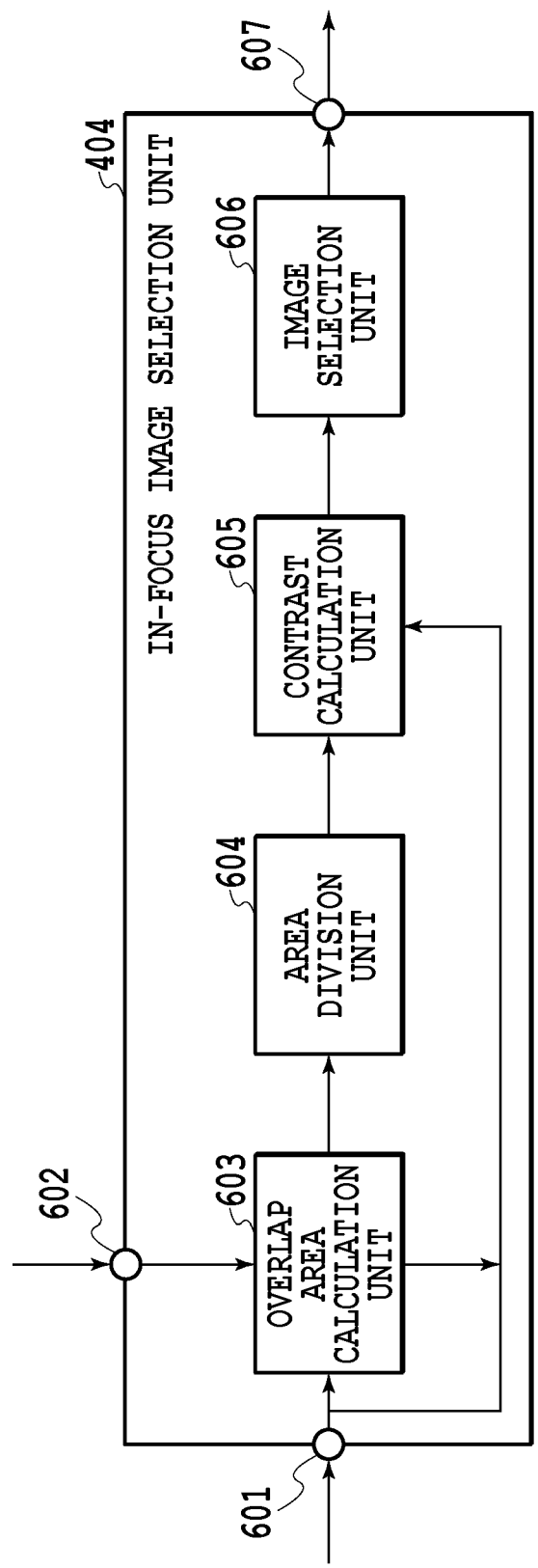
FIG. 6 is a block diagram showing an internal configuration of an in-focus image selection unit according to the first embodiment.

FIG. 6 is a block diagram showing an internal configuration of the in-focus image selection unit 404.

An image input terminal 601 inputs monochrome images stored in the memory unit 407. A parameter input terminal 602 inputs parameters acquired by the parameter acquisition unit 403. An overlap area calculation unit 603 calculates an area where the angles of view of the image capturing units overlap each other (hereinafter referred to as "overlap area") by using parameters supplied from the parameter input terminal 602. An area division unit 604 divides the area calculated by the overlap area calculation unit 603 into a plurality of sub-areas. A contrast calculation unit 605 calculates contrast in each sub-area image divided by the area division unit 604. An image selection unit 606 selects an in-focus image for each divided sub-area by using contrast values calculated by the contrast calculation unit 605. An image output terminal 607 outputs an in-focus image in each divided sub-area.

Next, the details of selection processing performed by each component 601 to 607 included in the in-focus image selection unit 404 will be described.

Figure 7:
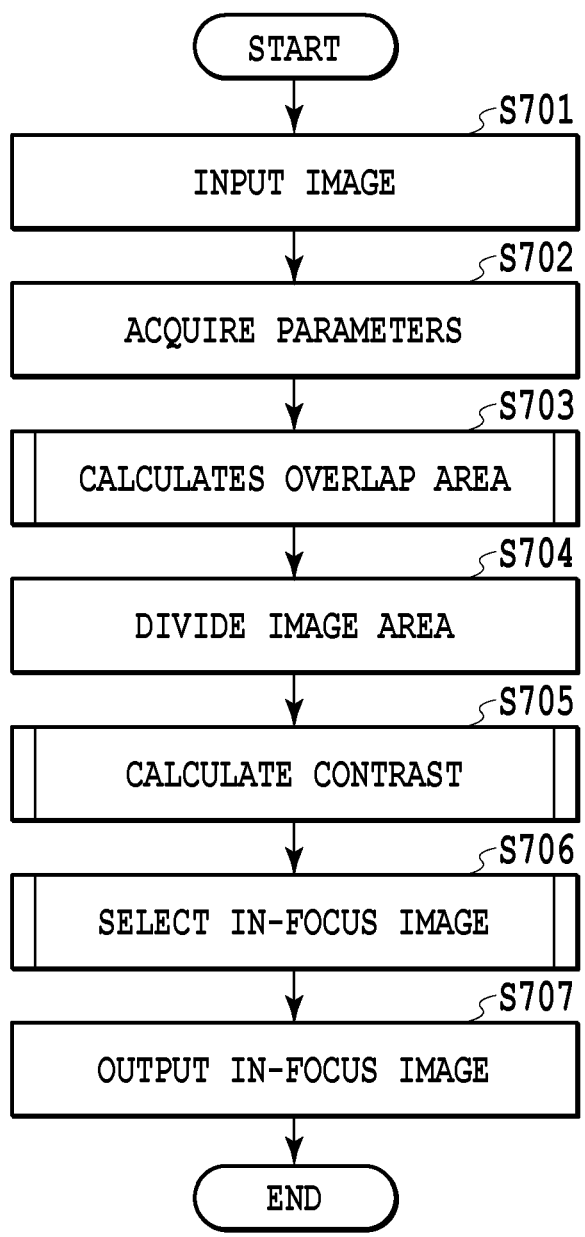
FIG. 7 is a flowchart showing a flow of an in-focus image selection process.

FIG. 7 is a flowchart showing a flow of the process in the in-focus image selection unit 404.

In step 701, an image input terminal 601 inputs monochrome images stored in the memory unit 407.

In step 702, the parameter input terminal 602 inputs parameters acquired by the parameter acquisition unit 403.

In step 703, the overlap area calculation unit 603 calculates an overlap area by using the acquired parameters. The details of the calculation method of the overlap area will be described later.

In step 704, the area division unit 604 divides the image area calculated by the overlap area calculation unit 603 into Ni×Nj sub-areas. Here, Ni indicates the number of divisions in the vertical direction. Nj indicates the number of divisions in the horizontal direction.

Figure 8:
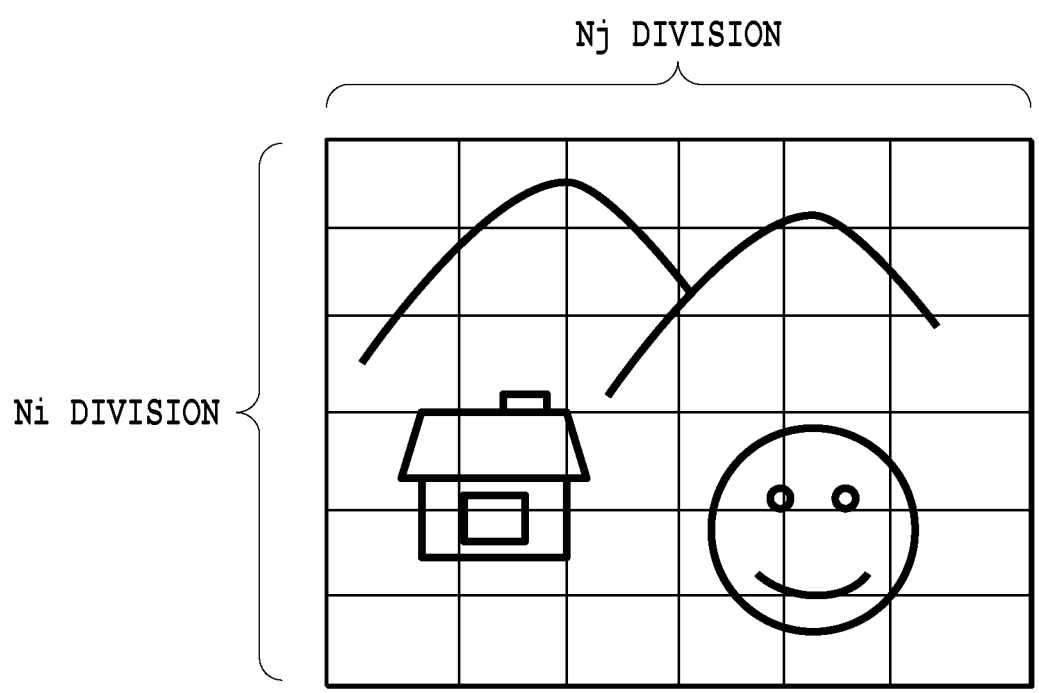
FIG. 8 is a diagram showing an example of area division.

FIG. 8 shows an example of an image divided by the area division unit 604. FIG. 8 shows that an image is divided into six areas in the vertical direction (Ni=6) and divided into six areas in the horizontal direction (Nj=6). The number of divided areas (Ni, Nj) is not limited to 6×6 (Ni=Nj=6) in the vertical and horizontal directions. The number of divisions may be greater than 6 or smaller than 6. For example, the number of divisions may be increased to 16 or may be decreased to 4. Further, the number of divisions in the vertical direction need not correspond to the number of divisions in the horizontal direction. For example, while the number of divisions in the vertical direction is still 6, the number of divisions in the horizontal direction may be changed to 10.

Let us return to the description of the flowchart in FIG. 7. When the division process of the image area is completed in step 704, in step 705, the contrast calculation unit 605 calculates a contrast value in each divided area. The process of the calculation method of the contrast value will be described later.

In step 706, the image selection unit 606 selects an in-focus image for each divided area by using contrast values calculated by the contrast calculation unit 605. The process of the selection method of an in-focus image will be described later.

Finally, in step 707, when the output terminal 607 outputs an in-focus image in which focused images selected in each divided area are combined, the process is completed.

<Calculation Process of Overlap Area>

Figure 9:
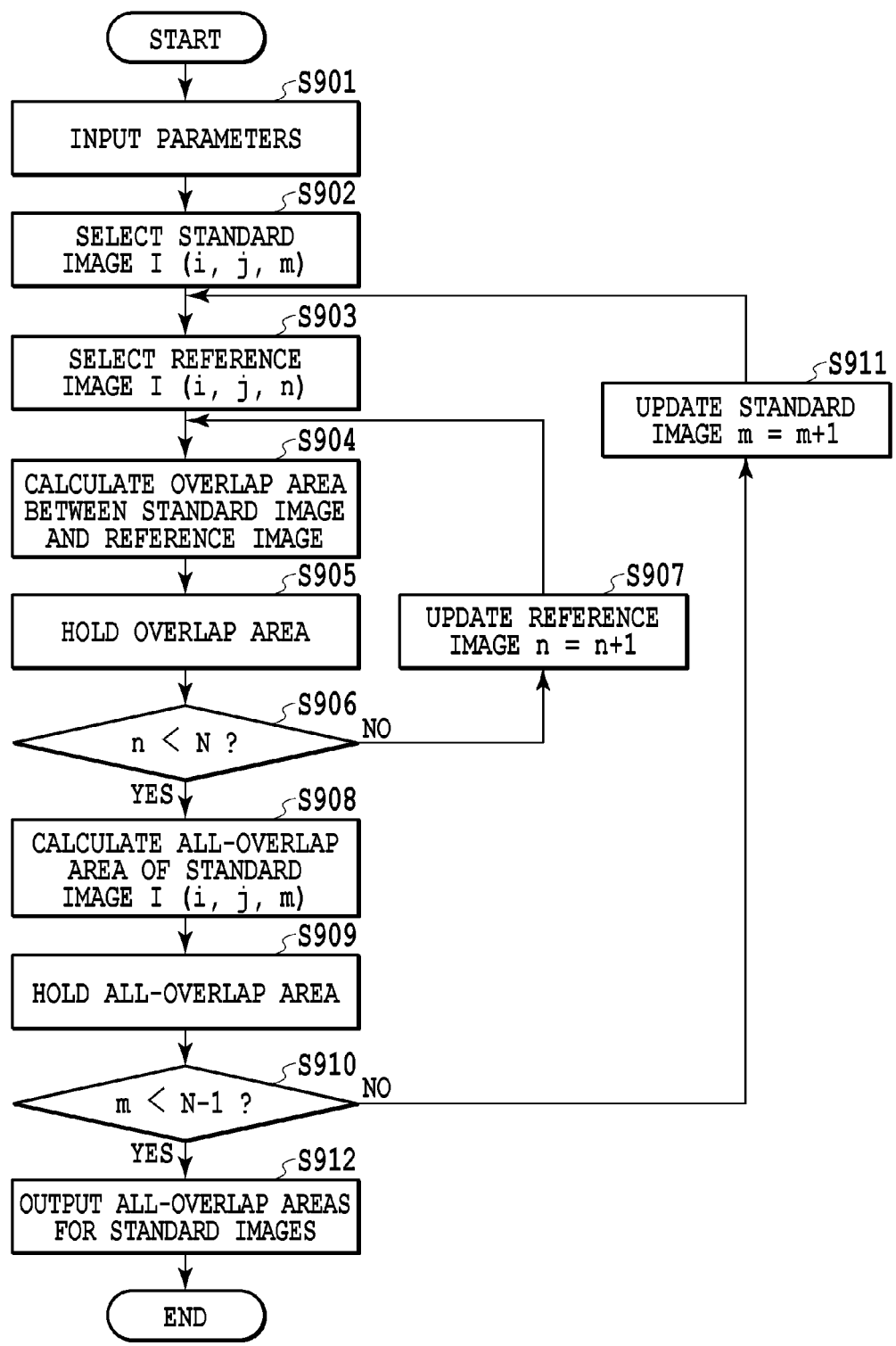
FIG. 9 is a flowchart showing a flow of an overlap area calculation process.

The details of the overlap area calculation process performed in step 703 in the flowchart of FIG. 7 will be described. FIG. 9 is a flowchart showing a flow of the overlap area calculation process.

In step 901, the overlap area calculation unit 603 receives the aforementioned parameters related to the image capturing units 101 to 109 from the parameter acquisition unit 403.

In step 902, the overlap area calculation unit 603 selects one standard image I (i, j, m), where an overlap area is desired to be calculated, from a plurality of monochrome image groups stored in the memory unit 407. Here, (i, j) is a variable representing a coordinate position on an image and m is a variable representing a number of the standard image, which starts from an initial value 0. The standard image selected in step 902 is a first selected standard image and, here, an image of I (i, j, 0) is selected.

In step 903, the overlap area calculation unit 603 selects one reference image I (i, j, n) to be compared with the standard image. Here, n is a variable representing a number of the reference image. The reference image selected in step 903 is a first selected reference image and the initial value of n is set to n=m+1. Here, the initial value of m is 0, so that an image of I (i, j, 1) is selected.

In step 907 and step 911 described below, the reference image and the standard image will be updated. The maximum value of m is N−2 and the maximum value of n is N−1 in a camera array image capturing device including N image capturing units.

Figure 10:
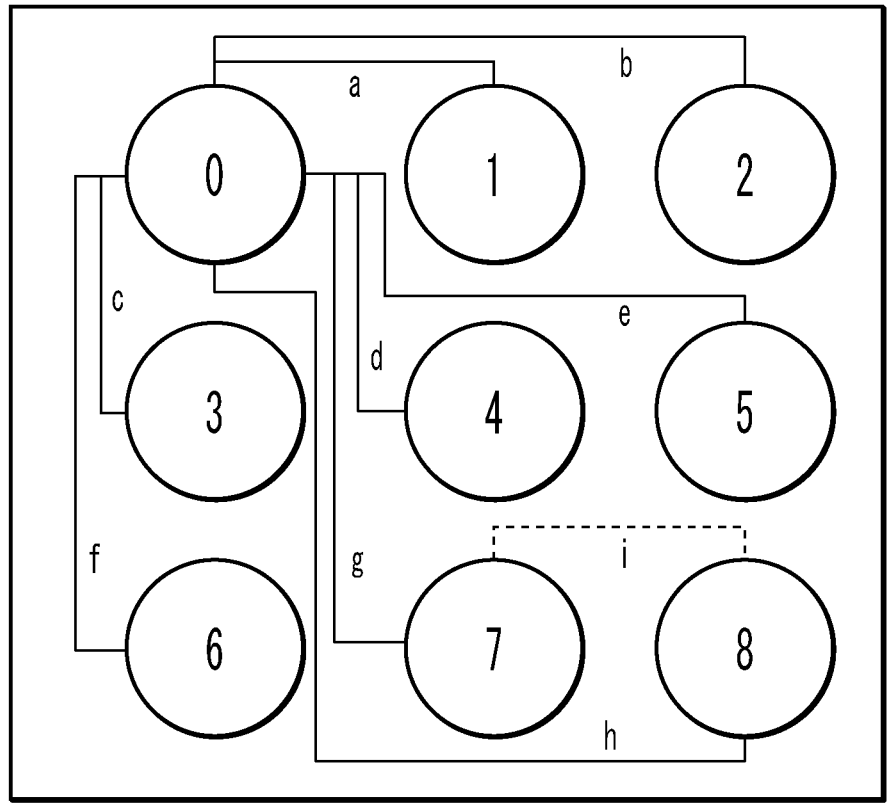
FIG. 10 is a diagram showing an example of a transition process of m and n until the overlap areas are calculated without omission.

FIG. 10 is a diagram showing a transition process of m and n until the overlap areas are calculated without omission in the case of the image capturing apparatus including nine image capturing unit shown in FIG. 1. For example, when m is the initial value 0, n may be a value from 1 to 8 and an overlap area is calculated for eight combinations indicated by solid lines a to h. The above process is repeated until m becomes (9−2=) 7. An overlap area need not be calculated again for the combinations that have been already acquired. Therefore, as the value of m increases, the number of combinations where an overlap area is calculated decreases one by one, and when m is 7, an overlap area is calculated only for one combination indicated by a dashed line i.

Let us return to the description of the flowchart in FIG. 9. In step 904, the overlap area calculation unit 603 calculates an overlap area between a selected standard image I (i, j, m) and a reference image I (i, j, n) on the basis of input parameters. In the first step 904 immediately after starting the process, the overlap area between a standard image (i, j, 0) and a reference image I (i, j, 1) is calculated.

Figure 11A:
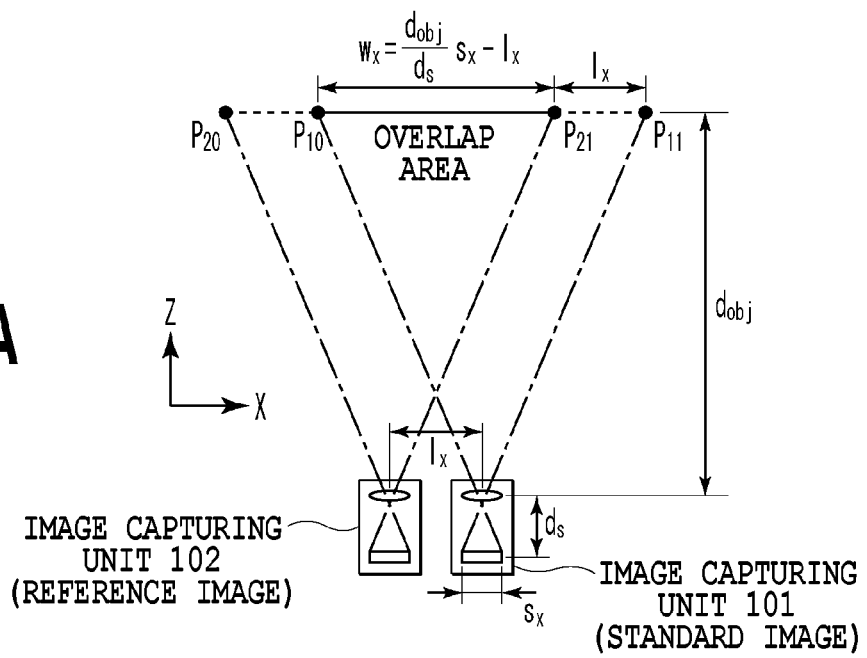
FIGS. 11A to 11C are diagrams for explaining the overlap area.
Figure 11B:
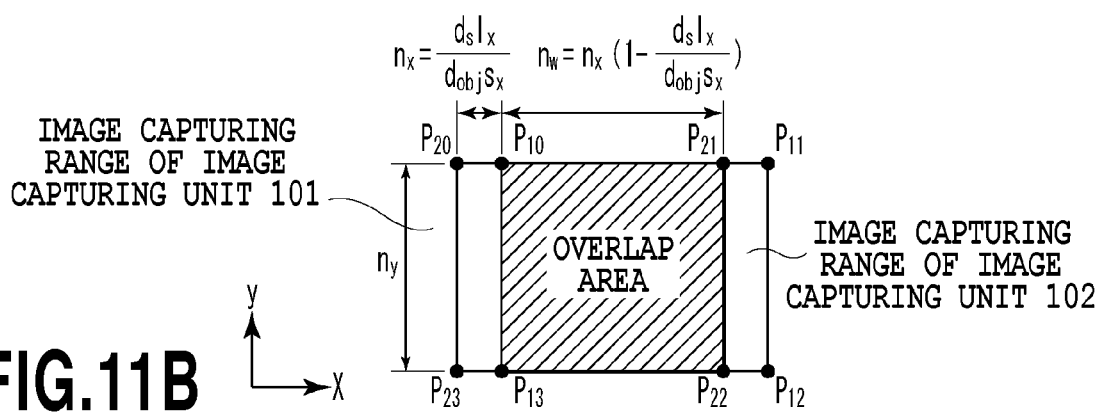
Figure 11C:
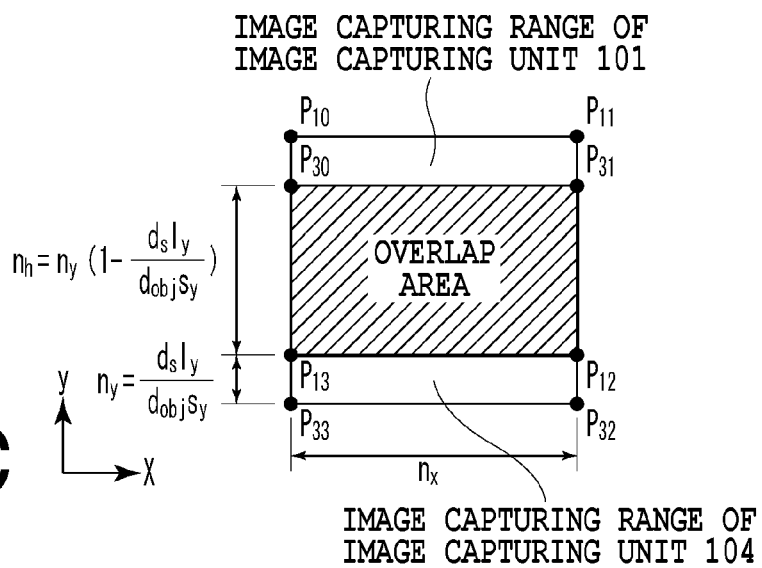

FIGS. 11A to 11C are diagrams for explaining the overlap area calculated in step 904. For simplicity of description, FIGS. 11A to 11C are schematic diagrams developed in a two-dimensional plane. In FIGS. 11A and 11B, the standard image is an image (i, j, 0) captured by the image capturing unit 101 and the reference image is an image (i, j, 1) captured by the image capturing unit 102.

FIG. 11A shows a state in which the image capturing unit 101 and the image capturing unit 102, which have the same specification and whose in-focus positions are set to be different from each other, are juxtaposed with an interval lx in the x direction. (Sx, Sy) indicates the sizes of the sensor in the (x, y) directions. A symbol $d_s$ is a focus length (a distance between the main lens and the sensor). A symbol $d_{obj}$ is a virtual focus length (a distance between the camera and a certain virtual plane). An area enclosed by dotted lines is an image capturing area of the camera, that is, the angle of view, which is determined by the sensor size and the focal length ds. A line segment of $[P_{10}, P_{21}]$ corresponds to a side of the overlap area in the x (horizontal) direction and the length wx of the side can be obtained by the formula 1.

$$w_x = \frac{d_{obj}}{d_s} S_x - l_x \quad \text{(Formula 1)}$$

FIG. 11B shows an example of an image (an image capturing range) captured by the image capturing unit 101, an image (an image capturing range) captured by the image capturing unit 102, and the overlap area of both images. An area surrounded by four points $[P_{10}, P_{11}, P_{12}, P_{13}]$ is the image capturing range of the image capturing unit 101. An area surrounded by four points $[P_{20}, P_{21}, P_{22}, P_{23}]$ is the image capturing range of the image capturing unit 102. A shaded area surrounded by four points $[P_{10}, P_{21}, P_{22}, P_{13}]$ is the overlap area. A line segment of $[P_{10}, P_{21}]$ corresponds to a side of the overlap area on a sensor surface in the x (horizontal) direction and the number of pixels $n_w$ of the side can be obtained by the formula 2.

$$n_w = n_x \left(1 - \frac{d_x l_x}{d_{obj} s_x}\right) \quad \text{(Formula 2)}$$

Here, $n_x$ is the number of horizontal pixels.

As described above, the image capturing unit 101 and the image capturing unit 102 are juxtaposed in the x direction, so that the same number of pixels as the number of vertical pixels $n_y$ of the sensor are included in the vertical overlap range.

FIG. 11C shows an example of the overlap area when the two cameras are juxtaposed in the y direction. FIG. 11C shows an image (an image capturing range) captured by the image capturing unit 101, an image (an image capturing range) captured by the image capturing unit 104, and the overlap area of both images. An area surrounded by four points $[P_{10}, P_{11}, P_{12}, P_{13}]$ is the image capturing range of the image capturing unit 101 and an area surrounded by four points $[P_{30}, P_{31}, P_{32}, P_{33}]$ is the image capturing range of the image capturing unit 104. A shaded area surrounded by four points $[P_{30}, P_{31}, P_{12}, P_{13}]$ is the overlap area. A line segment of $[P_{30}, P_{13}]$ corresponds to a side of the overlap area on a sensor surface in the y (vertical) direction and the number of pixels $n_h$ of the side can be obtained by the formula 3.

$$n_h = n_y \left(1 - \frac{d_s l_y}{d_{obj} s_y}\right) \quad \text{(Formula 3)}$$

Here, $n_y$ is the number of vertical pixels.

In this way, the overlap area between the standard image and the reference image is calculated in step 904.

In step 905, the overlap area calculation unit 603 stores data of the calculated overlap area in a memory.

In step 906, the overlap area calculation unit 603 determines whether or not the calculation of the overlap area is completed for all the reference images, that is, whether or not n reaches N−1. If the calculation of the overlap area is completed for all the reference images, the overlap area calculation unit 603 proceeds to step 908. On the other hand, if there is an unprocessed reference image (in the case of n<N−1), the overlap area calculation unit 603 proceeds to step 907. In step 907, the overlap area calculation unit 603 increments the value of n (n=n+1), updates the reference image, and returns to step 904.

In this way, the process from step 904 to step 906 is repeated until n reaches N−1. In step 908, the overlap area calculation unit 603 calculates a common area where all the overlap areas obtained for one standard image I (i, j, m) overlap each other (hereinafter referred to as "all-overlap area").

Figure 12:
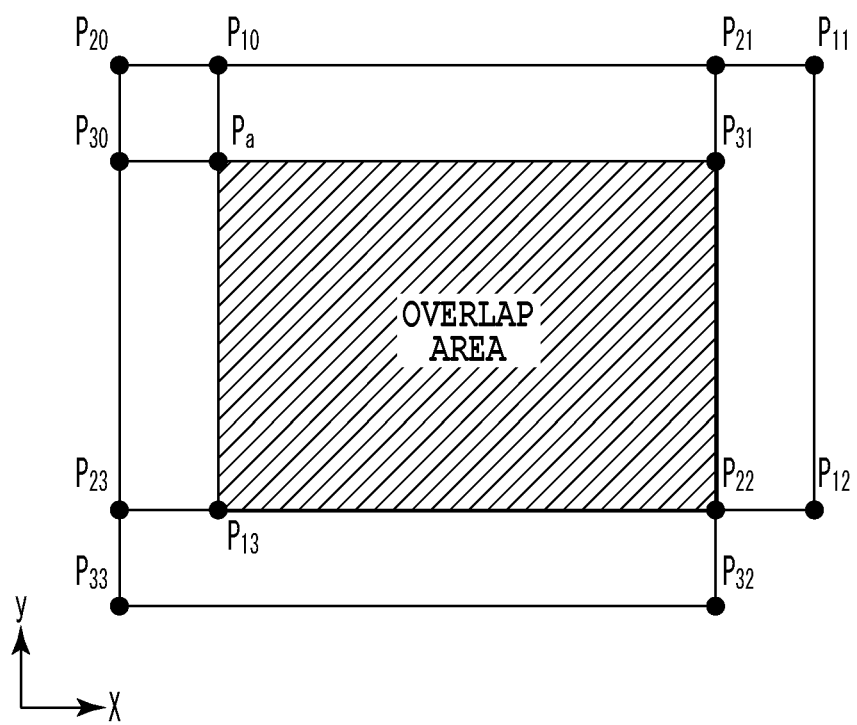
FIG. 12 is a diagram for explaining an all-overlap area.

FIG. 12 is a diagram for explaining the all-overlap area. Here, for convenience of the description, the image capturing areas of only three image capturing units 101, 102, and 104 are shown. However, if there are nine image capturing units, the all-overlap area corresponding to the image capturing areas of all the image capturing units is obtained.

The overlap areas of the three image capturing units 101, 102, and 104 are the areas shown in FIGS. 11B and 11C, so that an area where the two overlap areas overlap each other, that is, the shaded area surrounded by four points [$P_a$, $P_{31}$, $P_{22}$, $P_{13}$], is the all-overlap area in this case.

In step 909, the overlap area calculation unit 603 stores data of the all-overlap area for one standard image (i, j, m) obtained as described above in a memory.

In step 910, the overlap area calculation unit 603 determines whether or not the calculation of the all-overlap area is completed for all the standard images, that is, whether or not m reaches N−2. If the calculation of the all-overlap area is completed for all the standard images, the overlap area calculation unit 603 proceeds to step 912. On the other hand, if there is an unprocessed standard image (in the case of m<N−2), the overlap area calculation unit 603 proceeds to step 911. In step 911, the overlap area calculation unit 603 increments the value of m (m=m+1), updates the standard image, and returns to step 903. In this way, the process from step 903 to step 910 is repeated until m reaches N−2.

In step 912, the overlap area calculation unit 603 outputs the all-overlap areas for each of the standard images. In this way, the overlap area calculation process in step 703 in the flowchart of FIG. 7 is performed.

Although, for convenience of the description, in FIGS. 11A to 11C and FIG. 12, the image capturing ranges of the standard image and the reference image are shown, this does not necessarily mean that the calculation process of the overlap area in the overlap area calculation unit 603 is performed after actually receiving captured images that will be the standard image and the reference image. In other words, the overlap area calculation unit 603 may perform the calculation process of the overlap area after actually receiving captured images that will be the standard image and the reference image or may calculate the overlap area by only receiving parameters necessary to calculate the overlap area shown in formulas 1 to 3.

Figure 13A:
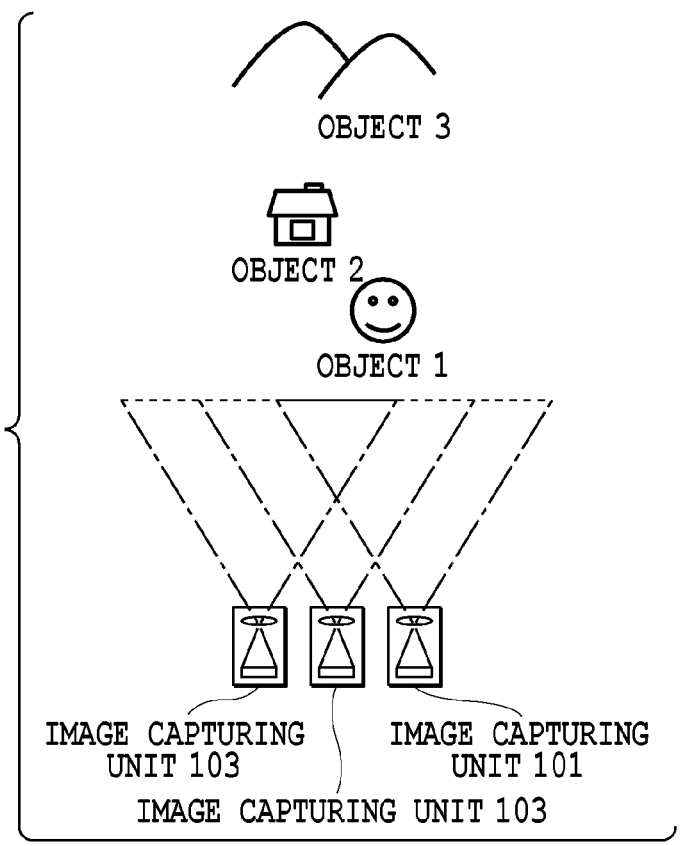
FIGS. 13A and 13B are diagrams showing an example of the overlap area (the all-overlap area) in the first embodiment.
Figure 13B:
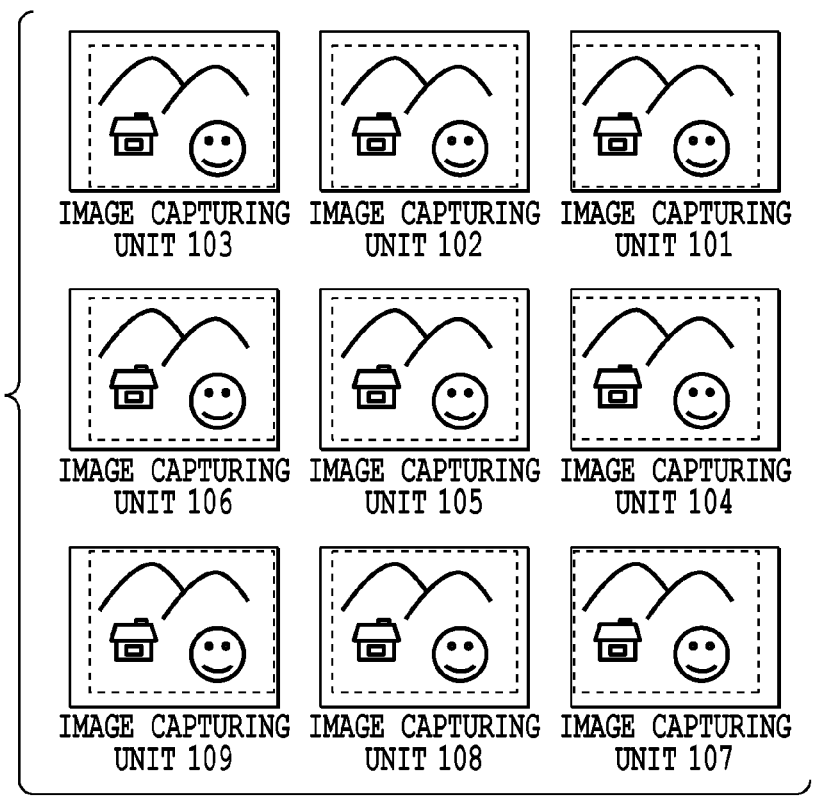

FIGS. 13A to 13B show an example of the overlap area (the all-overlap area) obtained when there are nine image capturing units. FIG. 13A shows a relationship between the image capturing units and the objects. In FIG. 13A, three types of objects (object 1, object 2, and object 3) are located at positions apart from the image capturing units 101 to 103 by different distances, respectively. The object 1 is located at a position nearest to the image capturing units and the object 3 is located at a position farthest from the image capturing units. FIG. 13B shows the all-overlap areas in images captured by the nine image capturing units 101 to 109. An area enclosed by a dotted line is the all-overlap area in each image capturing unit. The all-overlap area is defined in this way, so that the same image capturing area can be determined from images captured from different viewpoints.

<Calculation Process of Contrast>

Figure 14:
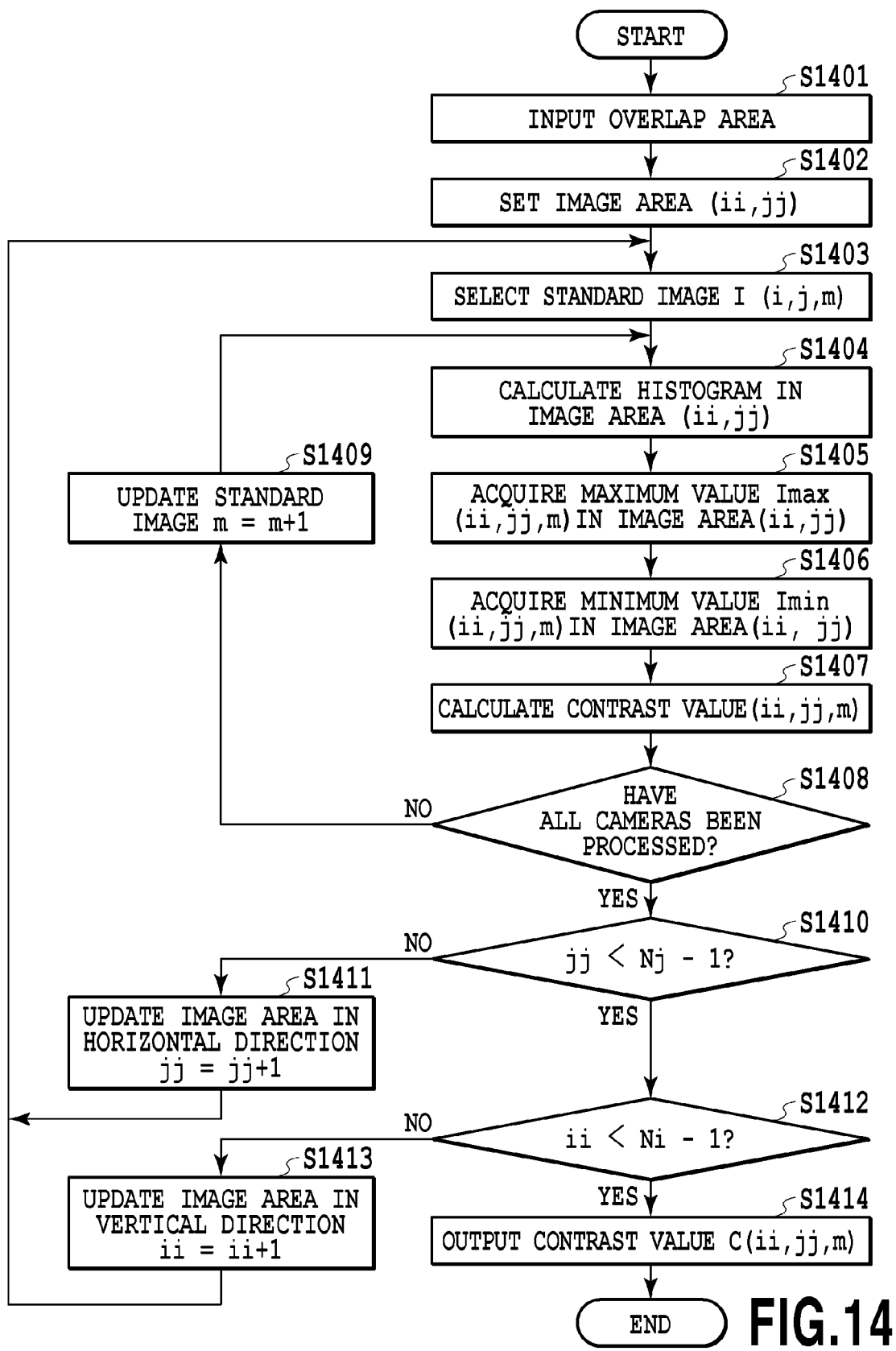
FIG. 14 is a flowchart showing a contrast calculation process.

FIG. 14 is a flowchart showing a flow of the contrast calculation process in step 705 in FIG. 7.

First, in step 1401, the contrast calculation unit 605 inputs images related to the overlap area in each image captured by the image capturing units 101 to 109, which is calculated by the overlap area calculation unit 603.

In step 1402, the overlap area calculation unit 605 selects one image area (ii, jj), where the contrast is desired to be calculated, from the image areas divided by the area division unit 604. Here, (ii, jj) are variables representing a coordinate position of a divided area. As described in FIG. 8, the area division unit 604 divides an image into Ni areas in the vertical direction and divides the image into Nj areas in the horizontal direction, so that the variables ii and jj vary in a manner such as ii=[0, 1, . . . , Ni−1] and jj=[0, 1, . . . , Nj−1]. Here, first, an image of (ii, jj)=(0, 0) is selected.

In step 1403, the contrast calculation unit 605 selects one standard image I (i, j, m) where the contrast is desired to be calculated. Here, (i, j) is a variable representing a coordinate position on an image and m is a variable representing a number of the standard image, which starts from an initial value 0. The standard image I (i, j, m) used by the contrast calculation unit 605 is digital data of a monochrome image corresponding to a standard image number m among the monochrome images supplied from the image input terminal 601. The standard image selected in step 1403 is a first selected standard image and, here, an image of I (i, j, 0) is selected.

In step 1404, the contrast calculation unit 605 calculates a histogram based on values of pixels in the image area (ii, jj) in the standard image I (i, j, m).

In step 1405, the contrast calculation unit 605 acquires a maximum value $I_{max}$ (ii, jj, m) of monochrome pixel values in the image area (ii, jj) on the basis of the histogram calculated in step 1404. In step 1406, the contrast calculation unit 605 acquires a minimum value $I_{min}$ (ii, jj, m) of monochrome pixel values in the image area (ii, jj) on the basis of the histogram calculated in step 1404. In step 1407, the contrast calculation unit 605 calculates a contrast value C (ii, jj, m) of the standard image m in the image area (ii, jj) by using the maximum value $I_{max}$ (ii, jj, m) and the minimum value $I_{min}$ (ii, jj, m). The contrast value can be obtained by the formula 4.

$$C(ii,jj,m) = (I\max(ii,jj,m) - I\min(ii,jj,m))/(I\max(ii,jj,m) + I\min(ii,jj,m)) \quad \text{(Formula 4)}$$

In step 1408, the contrast calculation unit 605 determines whether or not the calculation of the contrast value is completed for all the standard images, that is, whether or not m reaches N−1. If the calculation of the contrast value is completed for all the standard images, the contrast calculation unit 605 proceeds to step 1410. On the other hand, if there is an unprocessed standard image (in the case of m<N−1), the contrast calculation unit 605 proceeds to step 1409.

In step 1409, the contrast calculation unit 605 increments the value of m (m=m+1), updates the standard image, and returns to step 1404. In this way, the process from step 1404 to step 1408 is repeated until m reaches N−1.

In step 1410, the contrast calculation unit 605 determines whether or not the number of horizontal divisions in a vertical image area ii reaches Nj in the image areas shown in FIG. 8, that is, whether or not jj reaches Nj. If the number of horizontal divisions reaches Nj, the contrast calculation unit 605 proceeds to step 1412. On the other hand, if the number of horizontal divisions does not reach Nj (jj<Nj−1), the contrast calculation unit 605 proceeds to step 1411.

In step 1411, the contrast calculation unit 605 increments the value of jj, which indicates a number of the image area in the horizontal direction, (jj=jj+1), updates the image area (ii, jj) where the contrast value is calculated, and returns to step 1403. In this way, the process from step 1404 to step 1410 is repeated until jj reaches Nj−1.

In step 1412, the contrast calculation unit 605 determines whether or not the number of vertical divisions in a horizontal image area jj reaches Ni in the image areas shown in FIG. 8, that is, whether or not ii reaches Ni. If the number of vertical divisions reaches Ni, the contrast calculation unit 605 proceeds to step 1414. On the other hand, if the number of vertical divisions does not reach Ni (ii<Ni−1), the contrast calculation unit 605 proceeds to step 1413. In step 1413, the contrast calculation unit 605 increments the value of ii, which indicates a number of the image area in the vertical direction, (ii=ii+1), updates the image area (ii, jj) where the contrast value is calculated, and returns to step 1403. In this way, the process from step 1404 to step 1412 is repeated until ii reaches Ni−1. In step 1414, the contrast calculation unit 605 outputs the contrast value C (ii, jj, m). In this way, the contrast calculation process in step 705 in the flowchart of FIG. 7 is performed.

Although the formula 4 is used in the calculation method of the contrast value in the present embodiment, another contrast calculation method may be used. For example, an edge in an image area where the contrast value is desired to be calculated is extracted by filter processing or the like and an evaluation value such as the strength and the total amount of the edge component may be used as the contrast value. Another calculation method for calculating an evaluation value, by which the contrast or the sharpness of the image can be evaluated, may be used.

<In-Focus Image Selection Process>

Figure 15:
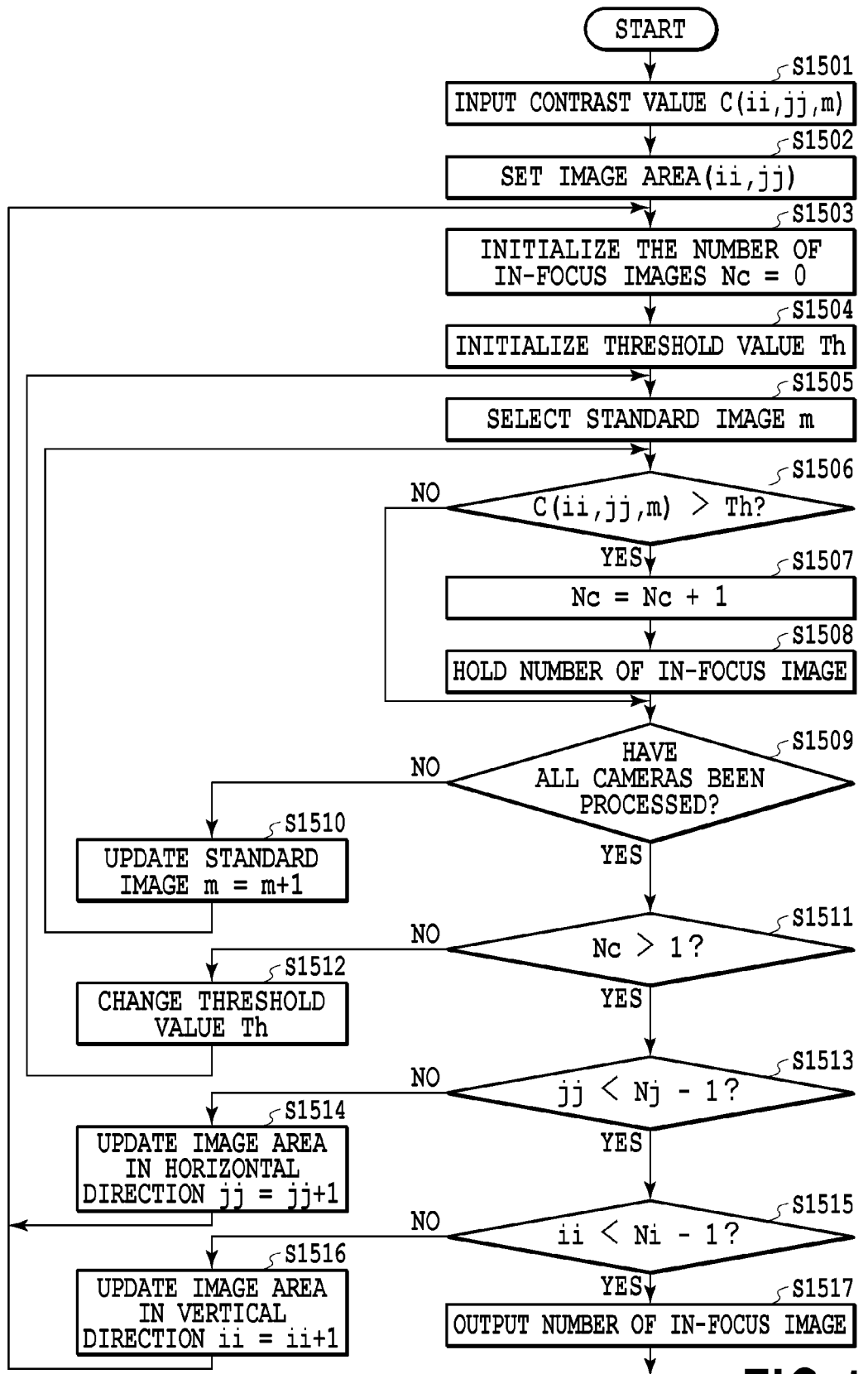
FIG. 15 is a flowchart showing a flow of an image selection process.

FIG. 15 is a flowchart showing a flow of the in-focus image selection process in step 706 in FIG. 7.

First, in step 1501, the image selection unit 606 inputs the contrast value C (ii, jj, m) calculated by the contrast calculation unit 605.

In step 1502, the image selection unit 606 selects one image area (ii, jj), where the in-focus image is desired to be selected, from the image areas divided by the area division unit 603. In step 1503, the image selection unit 606 sets a value Nc, which indicates the number of in-focus images, to zero (Nc=0).

In step 1504, the image selection unit 606 sets an initial value of a threshold value Th for determining whether or not the selected image is in focus. A user may set the threshold value Th in advance. In the present embodiment, the initial value of the threshold value Th is set to 0.6.

In step 1505, the image selection unit 606 selects one standard image m where whether or not the image is in focus is determined.

In step 1506, the image selection unit 606 determines whether or not the contrast value C (ii, jj, m) in the image area (ii, jj) of the standard image m is greater than the threshold value Th. If the contrast value is greater than the threshold value (C (ii, jj, m)>Th), that is, if the standard image m is determined to be in focus in the image area (ii, jj), the image selection unit 606 proceeds to step 1507. On the other hand, if the contrast value is smaller than or equal to the threshold value, the image selection unit 606 proceeds to step 1509.

In step 1507, the image selection unit 606 increments the value Nc, which indicates the number of in-focus images, (Nc=Nc+1).

In step 1508, the image selection unit 606 holds a number of the standard image m which is determined to be in focus in step 1506.

In step 1509, the image selection unit 606 determines whether or not the comparison between the contrast value and the threshold value is completed for all the standard images, that is, whether or not m reaches N−1. If the comparison between the contrast value and the threshold value is completed for all the standard images, the image selection unit 606 proceeds to step 1505. On the other hand, if there is an unprocessed standard image (in the case of m<N−1), the image selection unit 606 proceeds to step 1510. In step 1510, the image selection unit 606 increments the value of m (m=m+1), updates the standard image, and returns to step 1506.

By processing in this way, the process from step 1506 to step 1509 is repeated until m reaches N−1.

In step 1511, the image selection unit 606 determines whether or not the value Nc, which indicates the number of in-focus images, is two or more. If the number of in-focus images is two or more (Nc>1), the image selection unit 606 proceeds to step 1513. On the other hand, if it is determined that the number of in-focus images is not two or more, the image selection unit 606 proceeds to step 1512.

In step 1512, the image selection unit 606 changes the threshold value Th. In the change of the threshold value Th in step 1512, the threshold value Th is decreased. After the threshold value Th is decreased here, the process from step 1505 to step 1511 is repeated. In this way, the image selection unit 606 can obtain a plurality of in-focus images in order from an image having the highest contrast value in the image area (ii, jj).

The process from step 1513 to step 1516 is the same as the process from step 1410 to step 1413 in the flowchart showing a flow of the process in the contrast calculation unit 605 described in FIG. 14, so that the description thereof will be omitted.

Finally, in step 1517, the image selection unit 606 outputs the number of the image determined to be in focus in each image area, that is, the correspondence between the image area and the image capturing unit which captures the in-focus image. In this way, the in-focus image selection process in step 706 in the flowchart of FIG. 7 is performed.

Figures 16A, 16B:
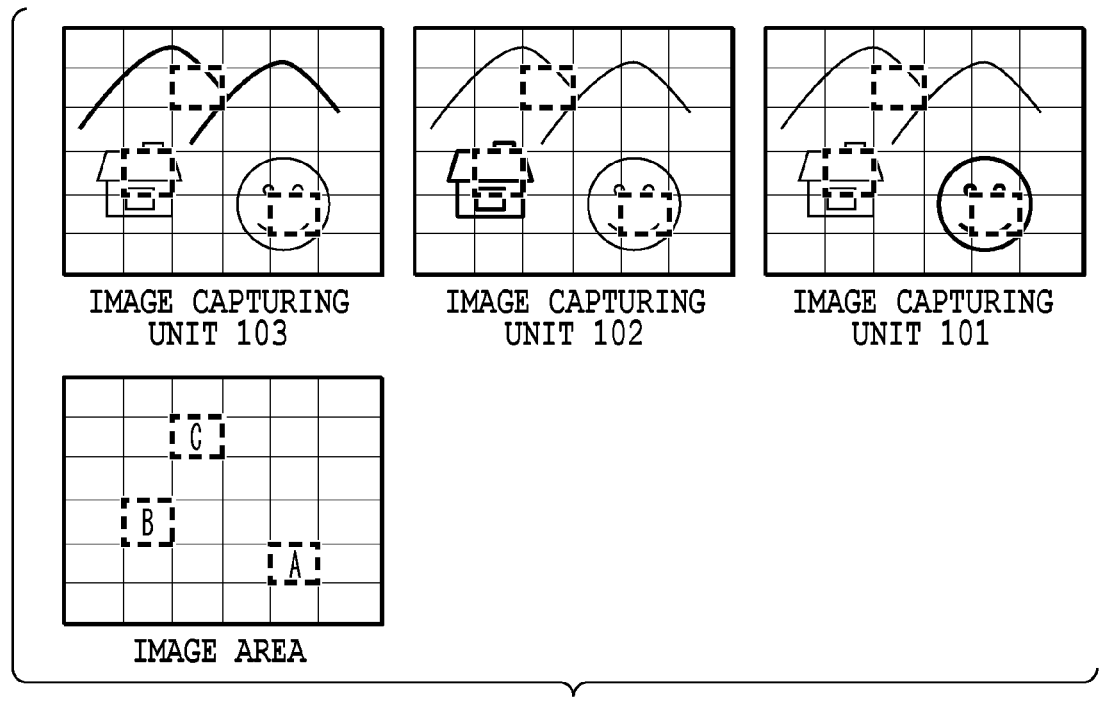
FIGS. 16A and 16B are diagrams showing an example of contrast values in a captured image and an image area.

FIGS. 16A and 16B show captured images of a scene including the objects 1 to 3 and contrast values at three positions of image areas A, B, and C. FIG. 16A shows an example of images captured by the image capturing units 101 to 103 of the nine image capturing units.

Areas enclosed by a dotted line in the captured images correspond to the image areas A, B, and C. FIG. 16B shows contrast values in the image areas A, B, and C in the images captured by the image capturing units 101 to 109.

For example, as shown in FIG. 16B, the contrast value in the image area A in the image captured by the image capturing unit 101 is 0.783. Similarly, the contrast values in the image area A in the images captured by the image capturing units 102 and 103 are 0.333 and 0.552 respectively.

The contrast values of the image capturing units 104 to 109 not shown in FIG. 16A are as shown in FIG. 16B. As described above, the determination whether or not a captured image in the divided image area is in focus is based on the magnitude comparison between the contrast value and the threshold value Th. The threshold value Th is a parameter that determines the selection of the in-focus image. If the threshold value Th is set to a relatively small value, the number of images selected as an in-focus image increases. However, in the present invention that uses distance estimation by a correlation between images, an image that is not sufficiently in focus may be included, so that the accuracy of distance estimation tends to degrade. On the other hand, if the threshold value Th is set to a relatively large value, when selecting in-focus images, it is possible to select images that are sufficiently in focus. However, the number of selected images decreases and an occlusion problem occurs when calculating a distance (the occlusion will be described later). In the present embodiment, considering trade-off between these, the threshold value Th is set to 0.6.

The in-focus image selection unit 404 determines that the images captured by the image capturing units 101 and 105, which have a value greater than the threshold value Th, are in-focus images in the image area A. The contrast values in the image area A of the images captured by the image capturing units other than the above are smaller than the threshold value (Th=0.6), so that the in-focus image selection unit 404 determines that the images captured by the image capturing units 102 to 104 and 106 to 109 are not in focus in the image area A.

The in-focus image selection unit 404 performs the same process on the image area B and the image area C and selects images captured by the image capturing units that provide an in-focus image in each image area. In the image area B, the in-focus image selection unit 404 selects images captured by two image capturing units 102 and 106 as in-focus images.

Further, in the image area C, the in-focus image selection unit 404 selects images captured by three image capturing units 103, 108, and 109 as in-focus images. This result shows that the image capturing units shown in FIG. 23 which include the objects 1 to 3 in a range of the depth of field thereof correspond to the image capturing units, the image captured by which is determined to be an in-focus image by the in-focus image selection unit 404. In summary, it is possible to select an in-focus image suited to calculate a distance by using the contrast value.

For simplicity of the description, in FIG. 16A, three image areas are described. However, also in the divided areas other than the divided areas A, B, and C, which are not described in FIG. 16A, the in-focus image selection unit 404 performs selection of in-focus image.

<Configuration Diagram of Distance Calculation Unit>

Figure 17:
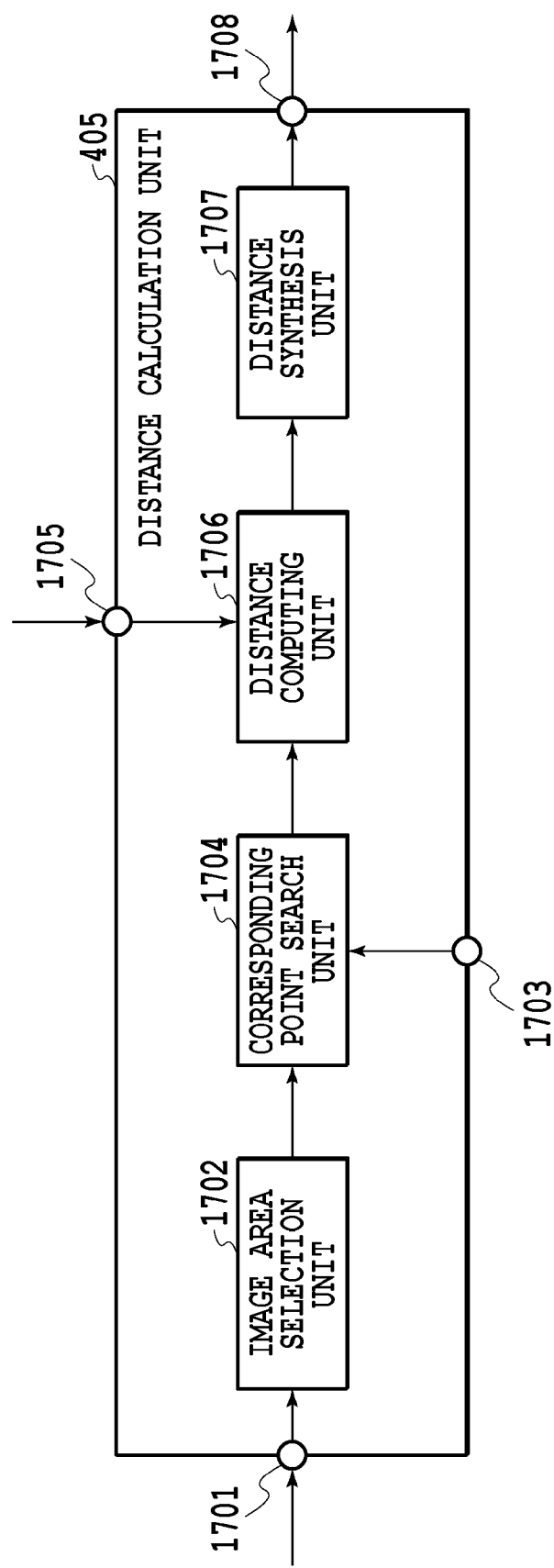
FIG. 17 is a block diagram showing an internal configuration of a distance calculation unit according to the first embodiment.

FIG. 17 is a block diagram showing an internal configuration of the distance calculation unit 405.

A number of the in-focus image in each divided area selected by the in-focus image selection unit 404 is input into an in-focus image number input terminal 1701. An image area selection unit 1702 sets an image area where a distance computing described later is desired to be performed. Digital data of a monochrome image to be stored in the memory unit 407 is input into an image input terminal 1703. A corresponding point search unit 1704 searches for a corresponding point between images in a plurality of monochrome images supplied from the image input terminal 1703. More specifically, the corresponding point search unit 1704 searches for a corresponding point between images for a plurality of in-focus images that are determined to be in focus by the in-focus image selection unit 404 in an image area selected by the image area selection unit 1702. Parameters acquired by the parameter acquisition unit 403 are input into a parameter input terminal 1705. A distance computing unit 1706 computes a distance to an object by using a result of the corresponding point search unit 1704. A distance synthesis unit 1707 synthesizes distance data in each image area computed by the distance computing unit 1706 and generates spatial distance data (hereinafter referred to as "range image"). Reference numeral 1708 denotes an output terminal of distance data. The range image synthesized by the distance synthesis unit 1707 is output from the output terminal 1708.

Next, the details of the distance calculation process performed by the above units in the distance calculation unit 405 will be described.

Figure 18:
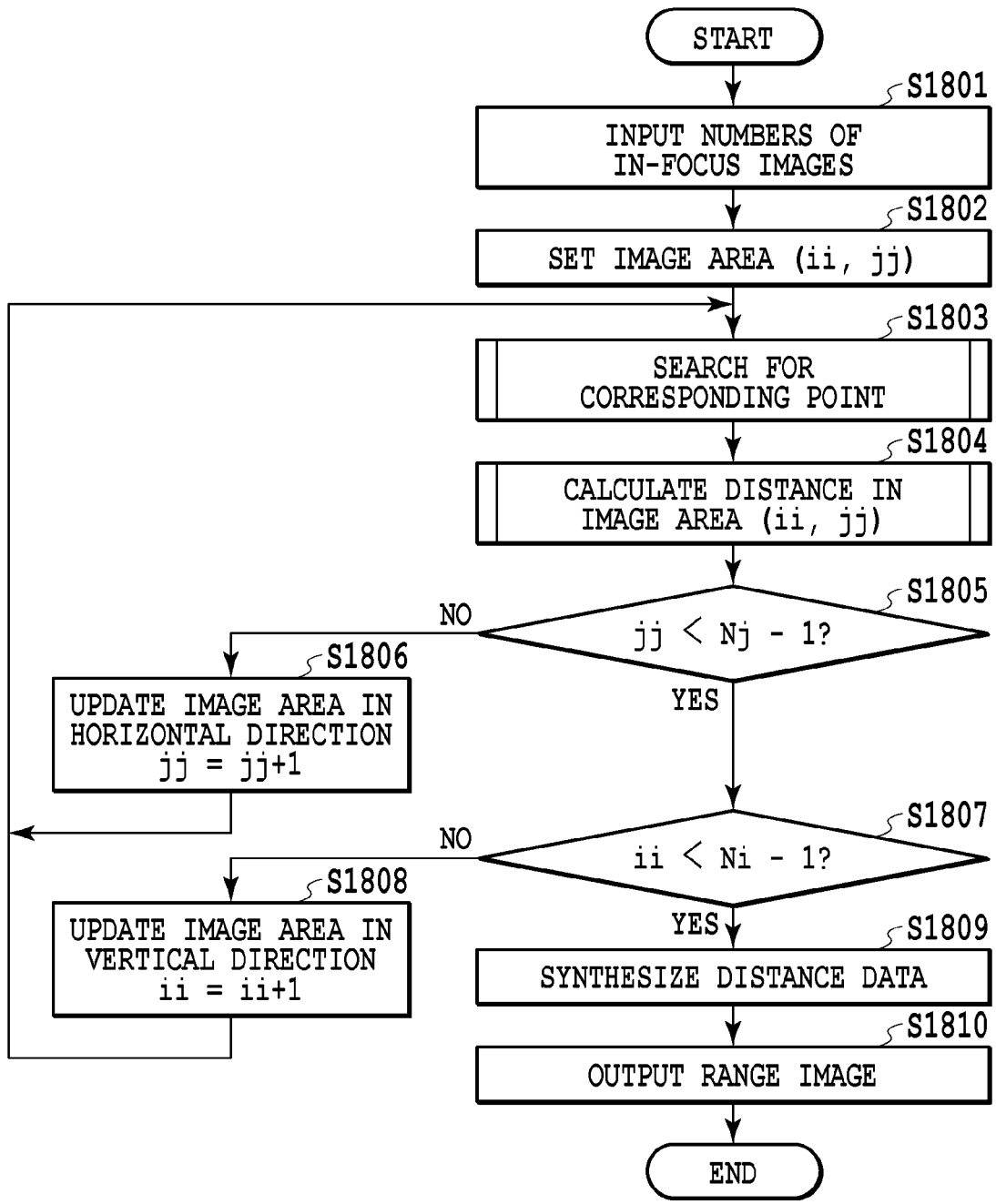
FIG. 18 is a flowchart showing a process flow of the distance calculation unit.

FIG. 18 is a flowchart showing a flow of the process in the distance calculation unit 405.

First, in step 1801, the in-focus image number input terminal 1701 inputs numbers of the in-focus images in each divided area selected by the in-focus image selection unit 404.

In step 1802, the image area selection unit 1702 selects one image area (ii, jj) from the image areas divided by the area division unit 603. Here, (ii, jj) are variables representing a coordinate position of a divided area.

In step 1803, a corresponding point between images in a plurality of monochrome images supplied from the image input terminal 1703 is searched for. The details of the corresponding point search process will be described later.

In step 1804, the distance computing unit 1706 computes distances to an object and a background by using the parameters supplied from the parameter input terminal 1705 and a result of the corresponding point search unit 1704. The details of the distance computing process will be described later.

The process from step 1805 to step 1808 is the same as the process from step 1410 to step 1413 in the flowchart showing a flow of the contrast calculation process described in FIG. 14, so that the description thereof will be omitted.

In step 1809, the distance synthesis unit 1707 synthesizes distance data computed by the distance computing unit 1706.

In step 1809, distance data calculated in each image area are synthesized as one distance data in order to generate the distance data as a spatial range image.

When the distance data output terminal 1708 outputs the range image synthesized by the distance synthesis unit 1707 in step 1810, the process is completed.

<Corresponding Point Search Process>

Figure 19:
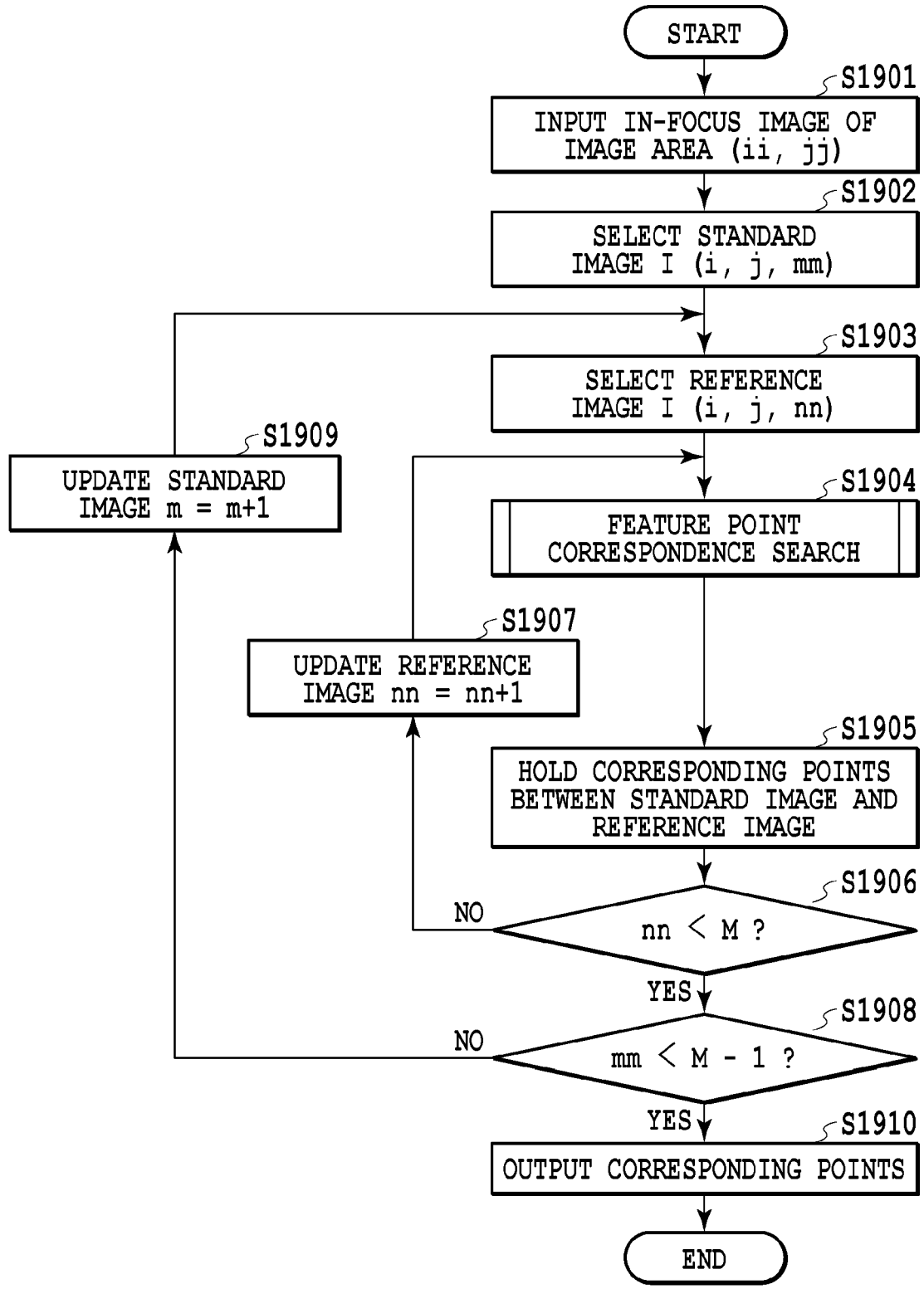
FIG. 19 is a flowchart showing a flow of a corresponding point search process according to the first embodiment.

FIG. 19 is a flowchart showing a flow of the corresponding point search process in step 1803 in the flowchart of FIG. 18.

When the corresponding point search process starts, first, in step 1901, the corresponding point search unit 1704 inputs the in-focus image in the image area (ii, jj).

In step 1902, the corresponding point search unit 1704 selects one standard image I' (i, j, mm), which is used as a standard when the corresponding point search process is performed, from a plurality of monochrome image groups stored in the memory unit 407. Here, (i, j) is a variable representing a coordinate position on an image and mm is a variable representing a number of the standard image, which starts from an initial value 0. The standard image selected in step 1902 is a first selected standard image and, here, an image of I (i, j, 0) is selected.

In step 1903, the corresponding point search unit 1704 selects one reference image I (i, j, nn) to be compared with the standard image. Here, nn is a variable representing a number of the reference image. The reference image selected in step 1903 is a first selected reference image and the initial value of nn is set to nn=m+1, so that an image of I (i, j, 1) is selected here. In step 1907 and step 1909 described later, the reference image and the standard image will be updated respectively. When there are M (ii, jj) in-focus images selected by the in-focus image selection unit 404, the maximum value of m is M (ii, jj)−2 and the maximum value of n is M (ii, jj)−1.

In step 1904, the corresponding point search unit 1704 performs a feature point correspondence search process between the standard image and the reference image in the image area (ii, jj). The details of the feature point correspondence search process will be described later.

In step 1905, the corresponding point search unit 1704 holds a relationship between the corresponding points of the standard image and the reference image obtained from a result of the feature point correspondence search.

In step 1906, the corresponding point search unit 1704 determines whether or not the corresponding point search is completed for all the reference images, that is, whether or not nn reaches M (ii, jj)−1. If the corresponding point search is completed for all the reference images, the corresponding point search unit 1704 proceeds to step 1908. On the other hand, if there is an unprocessed reference image (in the case of nn<M (ii, jj)−1), the corresponding point search unit 1704 proceeds to step 1907.

In step 1907, the corresponding point search unit 1704 increments the value of nn (nn=nn+1), updates the reference image, and returns to step 1904. In this way, the process from step 1904 to step 1906 is repeated until nn reaches M (ii, jj)−1. In step 1908, the corresponding point search unit 1704 determines whether or not the corresponding point search is completed for all the standard images, that is, whether or not mm reaches M (ii, jj)−2. If the corresponding point search is completed for all the standard images, the corresponding point search unit 1704 proceeds to step 1910. On the other hand, if there is an unprocessed reference image (in the case of mm<M (ii, jj)−2), the corresponding point search unit 1704 proceeds to step 1909.

In step 1909, the corresponding point search unit 1704 increments the value of mm (mm=mm+1), updates the standard image, and returns to step 1903. In this way, the process from step 1903 to step 1908 is repeated until mm reaches M (ii, jj)−2. In step 1910, the corresponding point search unit 1704 outputs the relationship between the corresponding points of the standard image and the reference image held in step 1905. In this way, the corresponding point search process in step 1803 in the flowchart of FIG. 18 is performed.

<Feature Point Correspondence Search Process>

Figure 20:
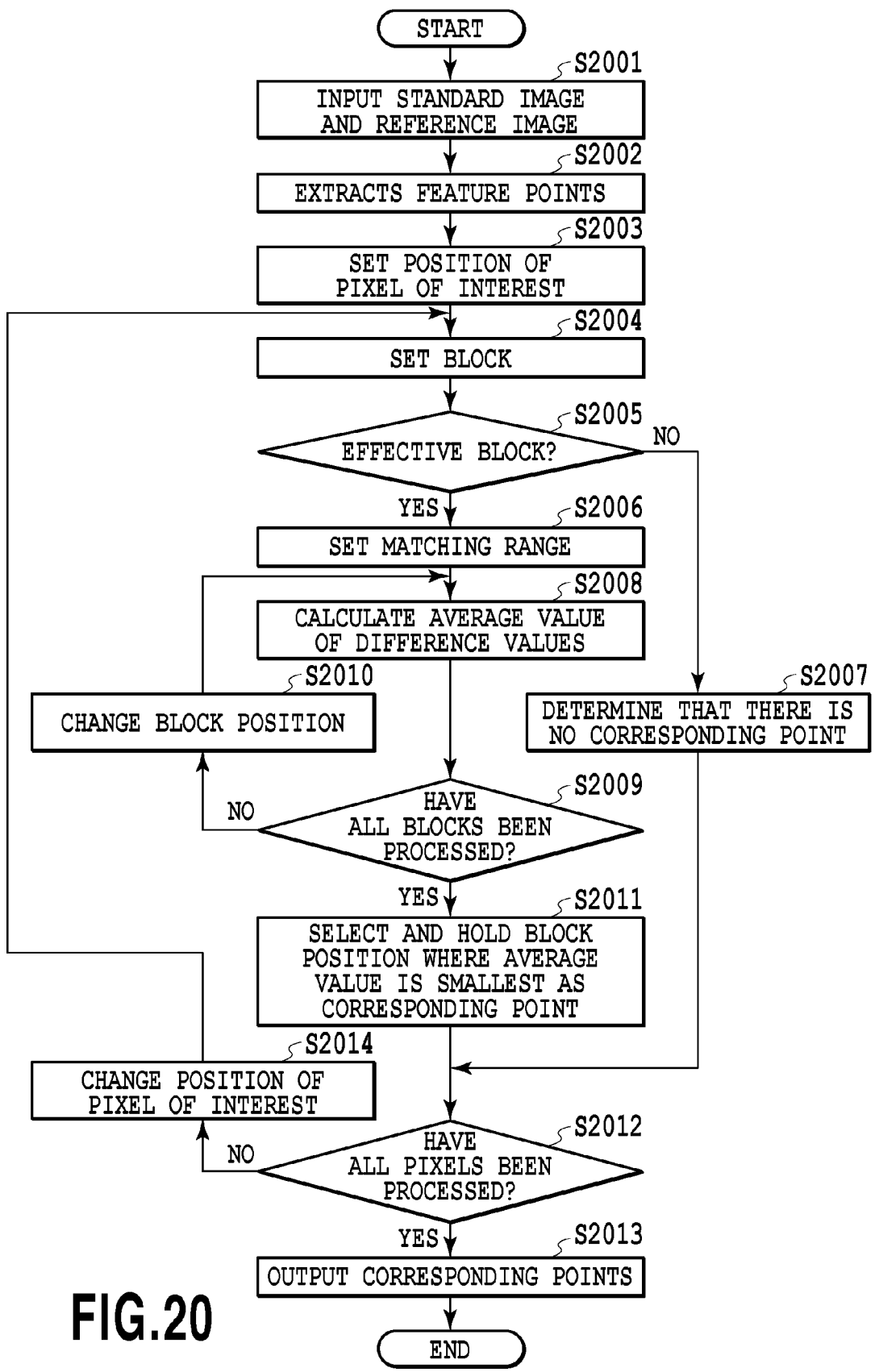
FIG. 20 is a flowchart showing a flow of a search process of a feature point.

FIG. 20 is a flowchart showing a flow of the feature point correspondence search process in step 1904 in the flowchart of FIG. 19.

First, in step 2001, the corresponding point search unit 1704 inputs the standard image and the reference image.

In step 2002, the corresponding point search unit 1704 extracts feature points of the input standard image. As a method for extracting feature points, a conventional edge detection filter process is used. In the present embodiment, a Sobel filer is used as an edge detection filter. However, another edge detection filter may be used to detect feature points. For example, Robinson's edge detection filter may be used. Further, feature points may be extracted by a method using a combination of these edge detection filters.

In step 2003, the corresponding point search unit 1704 sets a position (i, j) of a pixel of interest to search for a corresponding point in the standard image.

In step 2004, the corresponding point search unit 1704 sets a predetermined block (a block from which a difference value is obtained) around the set pixel of interest and the center position (ci, cj) of the block in the reference block.

In step 2005, the corresponding point search unit 1704 determines whether or not a block of the center position (ci, cj) set in the standard image is a block effective for the feature point correspondence search. When determining an effective block, the corresponding point search unit 1704 counts the number of the feature points in the block, which are extracted in step 2002, and if the number is greater than a pre-defined number, the block is determined to be an effective block. In other words, in step 2005, a block including many feature points in the block is determined to be an effective block by the corresponding point search unit 1704. If the block is determined to be an effective block, the corresponding point search unit 1704 proceeds to step 2006.

On the other hand, in step 2005, if the corresponding point search unit 1704 determines that the block of interest is not an effective block, the corresponding point search unit 1704 proceeds to step 2007.

In step 2006, the corresponding point search unit 1704 sets a range in which the corresponding point search unit 1704 performs the feature point correspondence search. The range in which the feature point correspondence search is performed may be set to any size considering the computing cost. However, the position (i, j) of the pixel of interest needs to be included in the range. Generally, when the parallax is large, the range in which the feature point correspondence search is performed is preferred to be large. On the other hand, when the parallax is small, the range in which the feature point correspondence search is performed may be small. More specifically, when the standard image and the reference image are images captured by image capturing units adjacent to each other in the image capturing apparatus shown in FIG. 1, the range in which the feature point correspondence search is performed is preferred to be small. On the other hand, when the standard image and the reference image are images captured by image capturing units located spatially far away from each other, the range in which the feature point correspondence search is performed is preferred to be large.

Figure 21A:
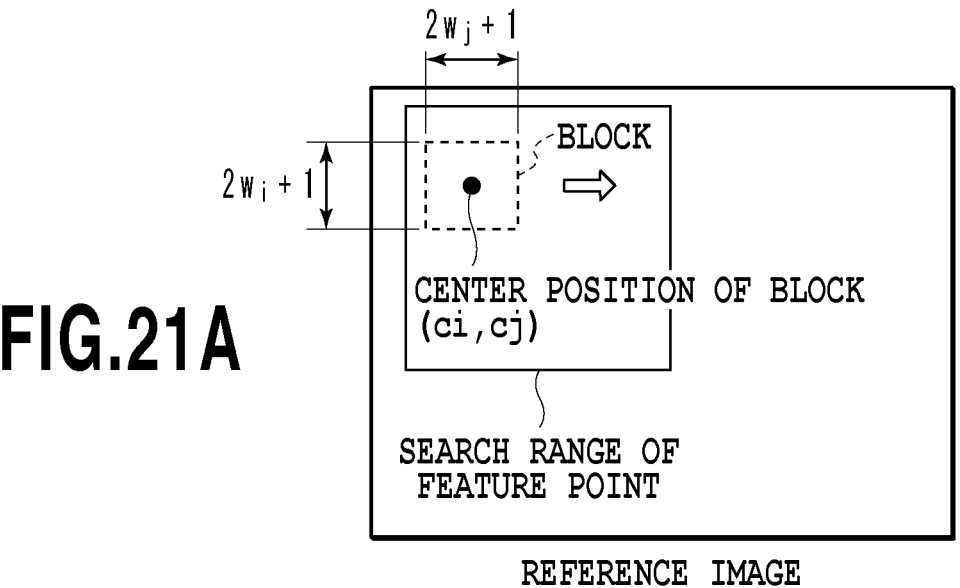
FIGS. 21A and 21B are diagrams for explaining the search process of a feature point.
Figure 21B:
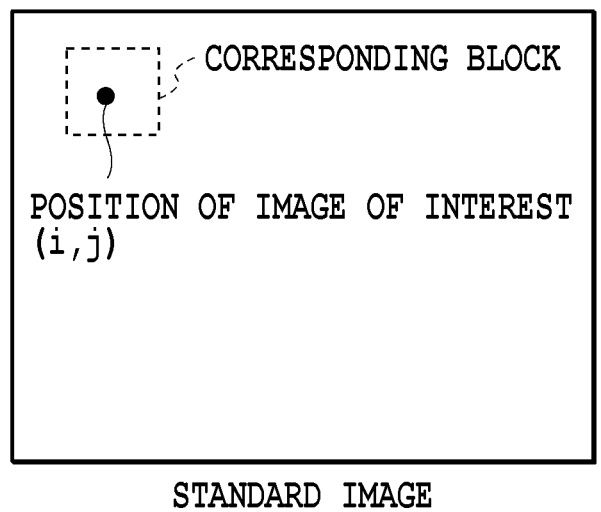

FIGS. 21A and 21B are diagrams showing a position (i, j) of the pixel of interest, a block set in the reference image, the center position of the block, and a set range in which the feature point correspondence search is performed. In this case, the block has a size determined by 2wi+1 pixels in the vertical direction and 2wj+1 pixels in the horizontal direction. Here, wi and wj are integers greater than or equal to zero.

Let us return to the description of the flowchart in FIG. 20. In step 2007, the corresponding point search unit 1704 determines that, in the reference image, there is no point corresponding to the position (i, j) of the pixel of interest in the standard image. The distance data at a pixel position where the corresponding point is determined to be absent is obtained by an interpolation process from distance data obtained from a nearby pixel where the corresponding point is successfully searched for. The interpolation process of distance data will be described later.

In step 2008, the corresponding point search unit 1704 calculates an average value of difference values using the standard image and the reference image in a range of a set block. The formula 5 is a computing formula for obtaining an average value $E_{ave}$(ci, cj, nn) of difference values at the center position (ci, cj) of the block.

$$E_{ave}(ci, cj, nn) = \frac{1}{(2w_i + 1)(2w_j + 1)} \sum_{a=-wi}^{wi} \sum_{b=-wj}^{wj} |I'(i+ci+a, j+cj+b, nn) - I'(i, j, mm)|$$ (Formula 5)

Here, I' (i, j, mm) represents an image of an overlap area in the standard image and I' (i, j, nn) represents an image of an overlap area in the reference image. Here, mm and nn are variables indicating numbers of the standard image and the reference image, respectively.

In step 2009, the corresponding point search unit 1704 determines whether or not the process for obtaining the average value of the difference values is completed for all the blocks in the set range in which the feature point correspondence search is performed. If the process for obtaining the average value of the difference values is completed for all the blocks, the corresponding point search unit 1704 proceeds to step 2011. On the other hand, if there is an unprocessed block, the corresponding point search unit 1704 proceeds to step 2010.

In step 2010, the corresponding point search unit 1704 updates the center position (ci, cj) of the block and changes the block position to a block position where the average value of the difference values is not obtained. After changing the block position, the corresponding point search unit 1704 returns to step 2008.

In step 2011, the corresponding point search unit 1704 obtains a center position (ci_min, cj_min) of a block where the average value of the difference values is smallest and selects the block position where the average value of the difference values is smallest in the set range in which the feature point correspondence search is performed as a corresponding point. In other words, the pixel position in the reference image nn corresponding to the image position (i, j) of the standard image mm is selected as (ci_min, cj_min). The result of the selected corresponding point is held in the following array.

$Ei(i,j,mm)=\{nn,ci\_min\}$ $Ej(i,j,mm)=\{nn,cj\_min\}$

Here, Ei (i, j, mm) represents a vertical position ci_min of the corresponding pixel in the reference image nn at the pixel position (i, j) of the standard image mm. Similarly, Ej (i, j, mm) represents a horizontal position cj_min of the corresponding pixel in the reference image nn at the pixel position (i, j) of the standard image mm.

In step 2012, the corresponding point search unit 1704 determines whether or not the process for obtaining the average value of the difference values is completed for all the pixels in the reference image. If the process for obtaining the average value of the difference values is completed for all the pixels, the corresponding point search unit 1704 proceeds to step 2013. On the other hand, if there is an unprocessed pixel, the corresponding point search unit 1704 proceeds to step 2014.

In step 2014, the corresponding point search unit 1704 updates the position (i, j) of the pixel of interest and changes the position of the pixel of interest to a position of a pixel where the average value of the difference values is not obtained. After changing the position of the pixel of interest, the corresponding point search unit 1704 returns to step 2004. In step 2013, when the corresponding point search unit 1704 outputs the corresponding points between the standard image and the reference image, which are obtained in the manner as described above, the process is completed.

Although, in the feature point correspondence search process in the present embodiment, as shown by the formula 5, the corresponding point between images is searched for on the basis of the average value of the difference values between the standard image and the reference image, other values may be used. For example, any value, such as a correlation coefficient, from which the similarity between images near the pixel of interest can be known, may be used when searching for a corresponding point.

<Distance Calculation Process>

Figure 22:
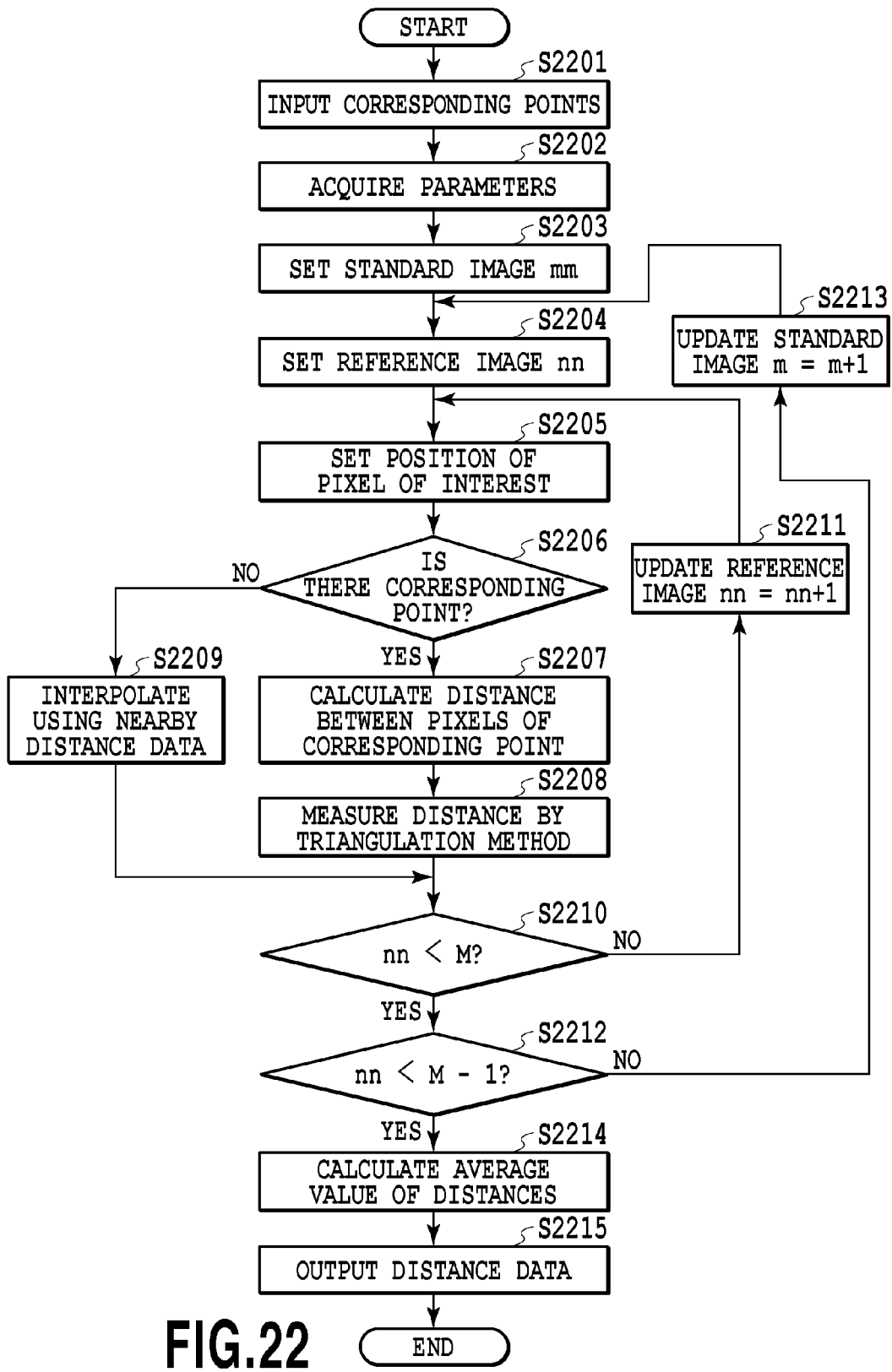
FIG. 22 is a flowchart showing a flow of a distance calculation process.

FIG. 22 is a flowchart showing a flow of the distance calculation process in step 1804 in the flowchart of FIG. 18.

First, in step 2201, the distance computing unit 1706 inputs the result of the corresponding points obtained by the corresponding point search unit 1704.

In step 2202, the distance computing unit 1706 acquires parameters supplied from the parameter input terminal 1705.

In step 2203, the distance computing unit 1706 selects one standard image mm to be a standard when calculating a distance. The standard image selected in step 2203 is a first selected standard image and, here, an image of mm=0 is selected.

In step 2204, the distance computing unit 1706 selects one reference image nn to be compared with the standard image. The reference image selected in step 2204 is a first selected reference image and the initial value of nn is set to nn=mm+1, so that an image of nn=1 is selected here. The handling of mm and nn which are values representing numbers of the standard image and the reference image is the same as that in the corresponding point search process described in FIG. 19, so that the description thereof will be omitted.

In step 2205, the distance computing unit 1706 sets a position (i, j) of a pixel of interest to estimate a distance in the standard image.

In step 2206, the distance computing unit 1706 determines whether or not there is a corresponding point between the standard image and the reference image at the position (i, j) of the pixel of interest. If it is determined that there is a corresponding point, the distance computing unit 1706 proceeds to step 2207.

In step 2207, the distance computing unit 1706 calculates a distance Δx(i, j, mm, nn) on an image between the position (i, j) of the pixel of interest on the standard image and a corresponding pixel position on the reference image.

$$\Delta x(i,j,mm,nn) = \sqrt{(i-ci\_min)^2 + (j-cj\_min)^2}$$ (Formula 6)

Here, (ci_min, cj_min) is a pixel position on the reference image nn corresponding to the pixel position (i, j) on the standard image mm. In step 2208, the distance computing unit 1706 calculates a distance d (i, j, mm, nn) at the position (i, j) of the pixel of interest by the triangulation method using the distance Δx(i, j, mm, nn) on the image. The distance is calculated according to the formula 7.

$$d(i, j, mm, nn) = ds(mm) \frac{\Delta x(i, j, mm, nn)}{l(mm, nn)}$$ (Formula 7)

Here, ds (mm) is a focus length of an image capturing unit that captures the standard image mm. l(mm, nn) is a distance between an image capturing unit that captures the standard image mm and an image capturing unit that captures the reference image nn in the camera. In the present embodiment, images are captured by a plurality of image capturing units in which focus is set at positions different from each other, so that the focus length of each image capturing unit is different from each other. Therefore, when a distance corresponding to the standard image mm is calculated, ds (mm), which is a focus length of the image capturing unit that captures the standard image, is used. On the other hand, in step 2206, if the distance computing unit 1706 determines that there is no pixel in the reference image which corresponds to the pixel of interest in the standard image, the distance computing unit 1706 proceeds to step 2009.

In step 2009, the distance computing unit 1706 calculates the distance d(i, j, mm, nn) at the position of the pixel of interest by an interpolation process using distance data calculated near the pixel of interest. As the interpolation process, a conventional interpolation process such as linear interpolation and spline interpolation is used. The process from step 2210 to step 2213 is the same as the process from step 1906 to step 1909 in the flowchart of the corresponding point search process in FIG. 19, so that the description thereof will be omitted. In step 2214, the distance computing unit 1706 obtains an average value $d_{ave}$ (i, j) of distance data at the pixel of interest (i, j) on the standard image. The calculation method of the average value of distance data is shown by the formula 8.

$$d_{ave}(i, j) = \frac{2}{M(M-1)} \sum_{mm=0}^{M-1} \sum_{nn=mm+1}^{M} d(i, j, mm, nn) \quad \text{(Formula 8)}$$

The reason why the average value of distance data is obtained is to improve the accuracy of the distance data. When a distance is calculated based on parallaxes between a plurality of images, there is a phenomenon in which a background portion captured by a certain image capturing unit is not captured by another image capturing unit when a foreground object blocks a view of the background portion. This phenomenon is called occlusion. In an image area in which the occlusion occurs, a corresponding point between images cannot be obtained, so that there is a problem that accurate distance calculation cannot be performed. To solve the problem, it is necessary to reduce image areas in which the occlusion occurs by, for example, using a camera array image capturing device such as the camera array image capturing device employed in the present embodiment and increasing the number of image capturing units. Further, a method which uses distance data measured from various viewpoints and generates final distance data is effective. To obtain the effect, as shown in formula 8, distance data obtained from a plurality of image capturing units are averaged. As the distance data at the position of the pixel of interest, a median value of a plurality of input distance data may be used instead of the average value. Finally, in step 2215, the distance computing unit 1706 outputs the distance data $d_{ave}$ (i, j) and completes the process.

In the present embodiment, as shown in FIG. 2, a providing method of the range image by color images obtained by a camera array image capturing device including a plurality of color image capturing units is described. In the camera array image capturing device, part or all of the image capturing units 101 to 109 may be replaced by image capturing units that capture a monochrome image. In this case, the color filter 308 in FIG. 3A, the monochrome image conversion unit 402 in FIG. 4, and the conversion process to a monochrome image in FIG. 5 (step 502) are omitted.

As described above, according to the present embodiment, it is possible to provide an accurate range image from an image group acquired by a camera array image capturing device.

(Second Embodiment)

In the first embodiment, in the corresponding point search process used to calculate a distance, a corresponding point in the reference image is searched for only for a pixel position at which a feature point is present in the standard image used to calculate a distance. Next, an aspect that a corresponding point in the reference image is searched for without obtaining a feature point from the standard image will be described as a second embodiment. The description of the same components as those in the first embodiment will be simplified or omitted, and, here, the differences from the first embodiment will be mainly described.

Figure 24:
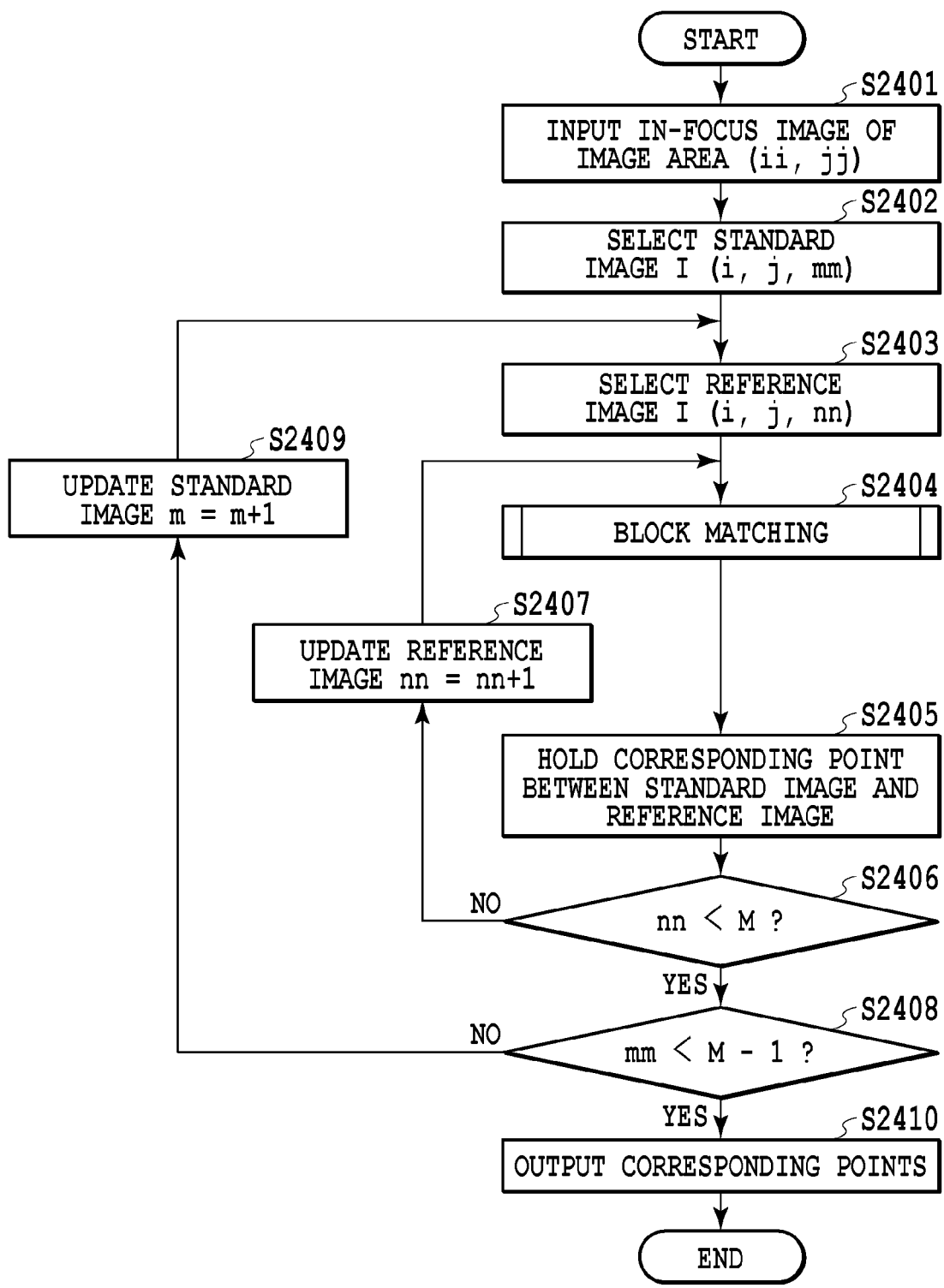
FIG. 24 is a flowchart showing a flow of a corresponding point search process according to a second embodiment.

FIG. 24 is a flowchart showing a flow of the process in the corresponding point search unit 1704 according to the present embodiment. The process from step 2401 to step 2403 is the same as the process from step 1901 to step 1903 in the flowchart of FIG. 19 according to the first embodiment. In step 2404, the corresponding point search unit 1704 performs a block matching process between the standard image and the reference image in the image area (ii, jj). The details of the block matching process will be described later. The process from step 2406 to step 2410 is the same as the process from step 1906 to step 1910 in the flowchart of FIG. 19 according to the first embodiment.

<Block Matching Process>

Figure 25:
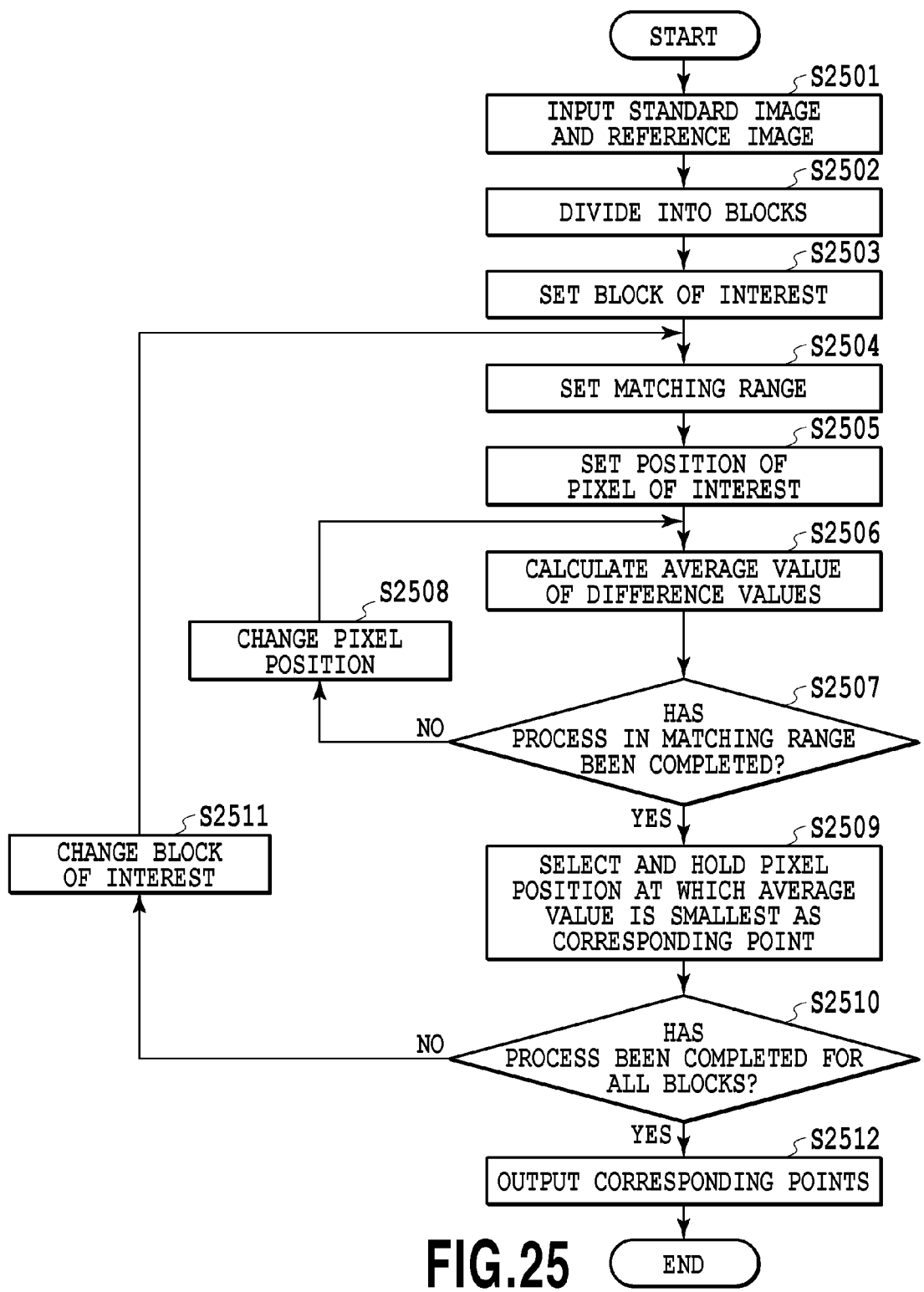
FIG. 25 is a flowchart showing a flow of a block matching process.

FIG. 25 is a flowchart showing a flow of the block matching process in step 2404 in the flowchart of FIG. 24.

First, in step 2501, the corresponding point search unit 1704 inputs the standard image and the reference image. In step 2502, the corresponding point search unit 1704 divides the input standard image into a plurality of blocks. In step 2503, the corresponding point search unit 1704 selects a block of interest from the plurality of divided blocks.

Figure 26:
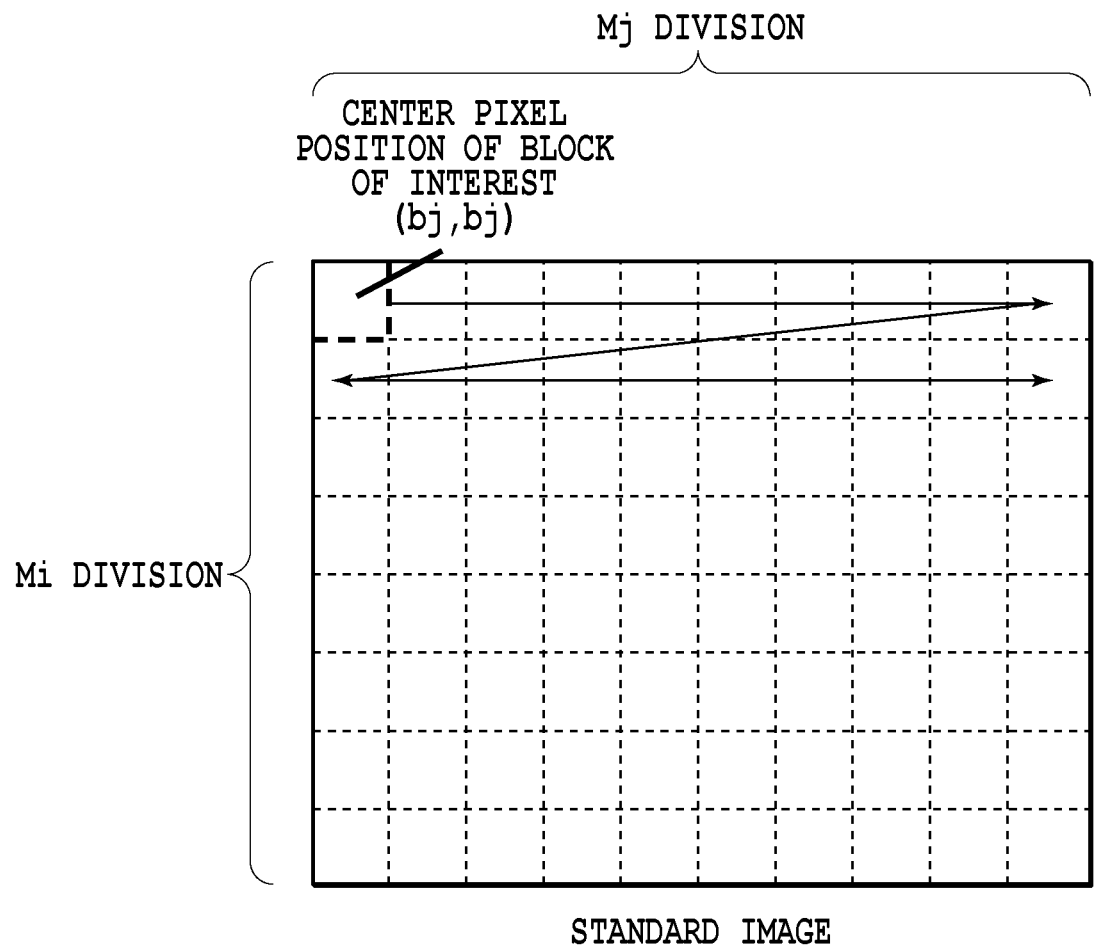
FIG. 26 is a diagram for explaining the block matching process.

FIG. 26 shows the standard image divided into blocks and a position (bi, bj) of the block of interest. The standard image is divided into Mi blocks in the vertical direction and Mj blocks in the horizontal direction. Therefore, the variables bi and bj, which represent the position of the block of interest, may have the following values: bi=[0, 1, . . . , Mi−1] and bj=[0, 1, . . . , Mj−1]. The corresponding point search unit 1704 selects the most upper-left block of the standard image divided into blocks as the first selected block of interest, so that (bi, bj)=(0, 0).

Let us return to the description of the flowchart in FIG. 25. In step 2504, the corresponding point search unit 1704 sets a range in which the block matching of the block of interest is performed. In the same manner as in the case in which the search range of the feature point is determined as shown in FIGS. 21A and 21B, the range in which the block matching is performed may be set to any size considering the computing cost. However, the position (bi, bj) of the block of interest needs to be included in the range. In step 2506, the corresponding point search unit 1704 sets a position (ci, cj) of a pixel of interest on which the block matching process computing is performed in the range in which the block matching is performed. In step 2505, the corresponding point search unit 1704 calculates an average value of difference values using the standard image and the reference image in a range of a set block. The formula 9 is a computing formula for obtaining an average value $E_{ave}(bi, bj, nn)$ of difference values at the center position (bi, bj) of the block.

$$E_{ave}(bi, bj, nn) = \frac{1}{(2w_i+1)(2w_j+1)} \sum_{a=-wi}^{wi} \sum_{b=-wj}^{wj} |I'(i+bi+a, j+bj+b, nn) - I'(i, j, mm)| \quad \text{(Formula 9)}$$

Here, I' (i, j, mm) represents an image of an overlap area in the standard image and I' (i, j, nn) represents an image of an overlap area in the reference image. Here, mm and nn are variables indicating numbers of the standard image and the reference image, respectively. In step 2507, the corresponding point search unit 1704 determines whether or not the process for obtaining the average value of the difference values is completed for all the pixel positions in the set matching range. If the process for obtaining the average value of the difference values is completed for all the pixel positions, the corresponding point search unit 1704 proceeds to step 2509. On the other hand, if there is an unprocessed pixel position, the corresponding point search unit 1704 proceeds to step 2508.

In step 2507, the corresponding point search unit 1704 changes the position (a, b) of the pixel of interest to a pixel position at which the average value of the difference values is not calculated in the block matching range set in the reference image. After changing the position of the pixel of interest, the corresponding point search unit 1704 returns to step 2506 and repeats the process of steps 2506 and 2507 until the process is completed for all the pixels in the block matching range.

In step 2509, the corresponding point search unit 1704 obtains a pixel position (ci_min, cj_min) at which the average value of the difference values is smallest and selects a block position at which the average value of the difference values is smallest in the set block matching range as a corresponding point. In short, the pixel position in the reference image nn corresponding to the block position (bi, bj) of the standard image mm is (ci_min, cj_min). The result of the selected corresponding point is held in the following array.

$Ei(bi,bj,mm)=\{nn,ci\_min\}$ $Ej(bi,bj,mm)=\{nn,cj\_min\}$

Here, Ei (bi, bj, mm) represents a vertical position ci_min of the corresponding pixel in the reference image nn at the block position (bi, bj) of the standard image mm. Similarly, Ej (bi, bj, mm) represents a horizontal position cj_min of the corresponding pixel in the reference image nn at the pixel position (i, j) of the standard image mm.

In step 2510, the corresponding point search unit 1704 determines whether or not the process for obtaining the average value of the difference values is completed for all the blocks shown in FIG. 26. If the process for obtaining the average value of the difference values is completed for all the blocks, the corresponding point search unit 1704 proceeds to step 2512. On the other hand, if there is an unprocessed block, the corresponding point search unit 1704 proceeds to step 2511.

In step 2511, the corresponding point search unit 1704 updates the position (bi, bj) of the pixel of interest and changes the position of the block of interest to a position of a block where the average value of the difference values is not obtained. After changing the position of the block of interest, the corresponding point search unit 1704 returns to step 2504 and repeats the process of steps 2504 to 2509 until the block matching process is completed for all the blocks. In step 2512, when the corresponding point search unit 1704 outputs the corresponding points between the standard image and the reference image, which are obtained in the manner as described above, the process is completed. In the block matching process of the present embodiment, search of the search point on the reference image corresponding to the center coordinate position of the block selected by the block matching is completed. Corresponding points corresponding to pixels other than the center coordinate position of the block are output as pixels having no corresponding point. For the pixels having no corresponding point, in the same manner as in the first embodiment, the distance computing unit 1706 obtains a corresponding pixel by using a result of a nearby pixel where the search of the corresponding point is completed.

As described above, according to the present embodiment, the search process of the corresponding point is performed without obtaining the feature point, so that it is possible to simplify the process performed in the image processing unit 212.

(Third Embodiment)

In the first and the second embodiments, the range image is generated on the basis of captured images acquired by a plurality of image capturing units in which the focus position is determined in advance. Next, an aspect that the range image is generated by controlling the focus position of each image capturing unit according to a distance to an object whose image is to be captured will be described as a third embodiment. The description of the same components as those in the first or the second embodiment will be simplified or omitted, and, here, the differences from the first and the second embodiments will be mainly described.

<Configuration Diagram of Image Capturing Unit Controller>

Figure 27:
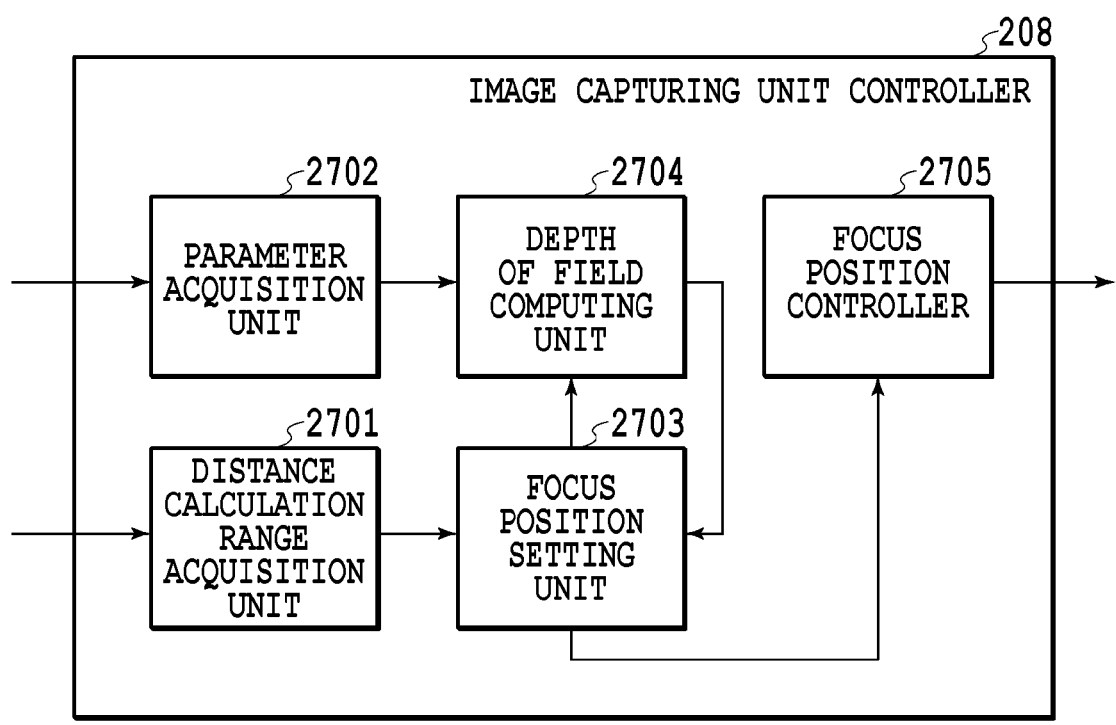
FIG. 27 is a block diagram showing an internal configuration of an image capturing unit controller according to a third embodiment.

FIG. 27 is a block diagram showing an internal configuration of the image capturing unit controller 208 for controlling the focus position of each image capturing unit according to a distance to an object whose image is to be captured.

A distance calculation range acquisition unit 2701 acquires a distance calculation range supplied through the bus 204. The distance calculation range is provided from the operation unit 205 by an instruction of a user. A parameter acquisition unit 2702 acquires various parameters of the image capturing units 101 to 109 when an image is captured. A focus position setting unit 2703 sets the focus position of each image capturing unit on the basis of the distance calculation range acquired by the distance calculation range acquisition unit. A depth of field computing unit 2704 computes the depth of field of each image capturing unit by using the various parameters supplied from the parameter acquisition unit 2702 and the focus positions set by the focus position setting unit 2703. A focus position controller 2705 controls the focus position of each image capturing unit on the basis of the result determined by the focus position setting unit 2703.

The internal configuration and the process flow of the image processing unit 212 of the present embodiment are the same as those in the first and the second embodiments, so that the description thereof will be omitted.

Figure 28:
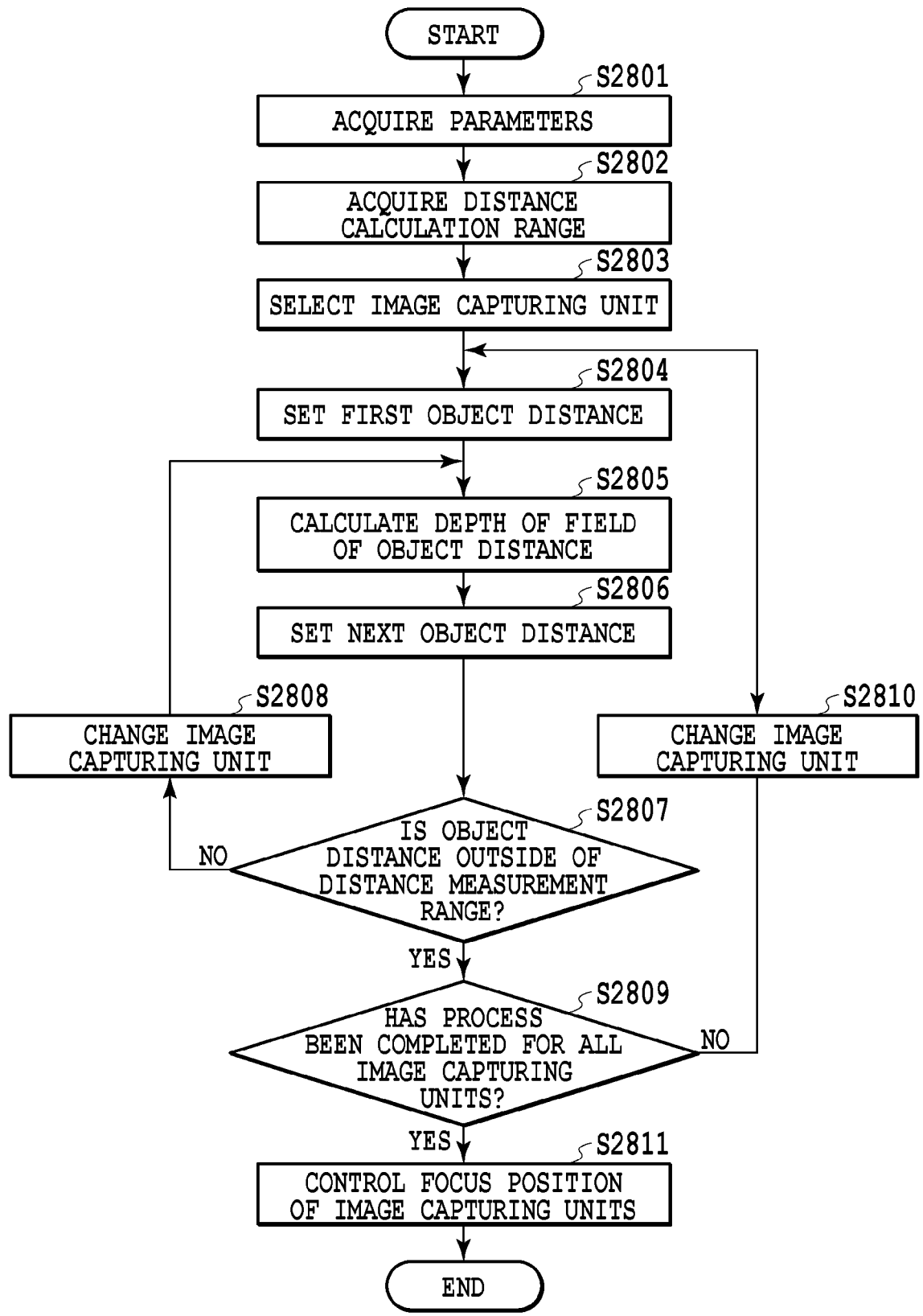
FIG. 28 is a flowchart showing a process flow in the image capturing unit controller according to the third embodiment.

FIG. 28 is a flowchart showing a process flow in the image capturing unit controller 208. In step 2801, the parameter acquisition unit 2702 receives the aforementioned parameters related to the image capturing units 101 to 109.

In step 2802, the distance calculation range acquisition unit 2701 acquires the distance calculation range for calculating a distance. In the present embodiment, a distance to an object of 1 m to 3 m is set as a distance calculation range based on a user's instruction.

In step 2803, the focus position setting unit 2703 selects an image capturing unit to which the focus position is set. The image capturing unit 101 is selected as a first image capturing unit to which the focus position is set.

In step 2804, the focus position setting unit 2703 sets a first object distance to the image capturing unit selected in step 2803. Here, the nearest distance, that is, 1 m, in the distance calculation range acquired in step 2802 is set as a first object distance.

In step 2805, the depth of field computing unit 2704 calculates a front depth of field and a rear depth of field of the set object distance. The formula 10 shows a calculation formula of the front depth of field df. The formula 11 shows a calculation formula of the rear depth of field db.

$$df = \left(1 - \frac{\varepsilon F(d_{obj} - f)}{f^2 + \varepsilon F(d_{obj} - f)}\right) d_{obj} \quad \text{(Formula 10)}$$

$$db = \left(1 + \frac{\varepsilon F(d_{obj} - f)}{f^2 - \varepsilon F(d_{obj} - f)}\right) d_{obj} \quad \text{(Formula 11)}$$

Here, f is the focal length of the image capturing unit, F is the F-number of the image capturing unit, $\varepsilon$ is a diameter of the permissible circle of confusion, and $d_{obj}$ is a distance from the image capturing unit to the object. The focal length and the F-number are parameters of the image capturing unit and are values supplied from the parameter acquisition unit 2702. For convenience of description, in the present embodiment, the focal lengths and the F-numbers of all the image capturing units are set to the same value respectively, so that f is set to 35 mm and F is set to 5.6.

The focal length and the F-number may be parameters different for each image capturing unit. All the image capturing units may have parameters different from those of other image capturing units. Or, part of the image capturing units may have the same parameters and the other image capturing units may have different parameters.

The diameter $\varepsilon$ of the permissible circle of confusion is one of parameters that affect the range of the depth of field. When the diameter $\varepsilon$ of the permissible circle of confusion is set to a relatively large value, the range of the depth of field increases. However, in the present invention that uses distance estimation by a correlation between images, the accuracy of distance estimation tends to degrade at the ends of the depth of field.

On the other hand, when the diameter $\varepsilon$ of the permissible circle of confusion is set to a relatively small value, it is possible to prevent the accuracy of distance estimation at the ends of the depth of field from degrading. However, the range of the depth of field decreases, so that it is difficult to calculate a distance in a wide range. In the present embodiment, considering trade-off between these, the diameter $\varepsilon$ of the permissible circle of confusion is set to 40 um. The size of the diameter of the permissible circle of confusion may be a fixed value or can be set from outside by a user.

The object distance $d_{obj}$=1 m determined in step 2804 is substituted. When these parameters are substituted in the formula 10 and the formula 11, the front depth of field df and the rear depth of field db are calculated as df=0.85 m and db=1.21 m, respectively.

In step 2806, the focus position setting unit 2703 sets an object distance where the depth of field is calculated next time. Here, the rear depth of field db calculated in step 2805 is set as the next object distance. In this case, 1.21 m is set to the next object distance $d_{obj}$. In step 2807, the focus position setting unit 2703 determines whether or not the set object distance $d_{obj}$ is located outside the distance calculation range determined in step 2802. If it is determined that the object distance $d_{obj}$ is located outside the distance calculation range (1 m to 3 m), the focus position setting unit 2703 proceeds to step 2809.

In step 2807, if it is determined that the object distance $d_{obj}$ is located inside the distance calculation range, the focus position setting unit 2703 proceeds to step 2808.

In step 2808, the focus position setting unit 2703 changes the image capturing unit to which the focus position is set in order to select an image capturing unit to which the focus position is set next time, and returns to step 2805.

In step 2809, the focus position setting unit 2703 determines whether or not the focus position setting is completed for all the image capturing units. If the focus position setting is completed for all the image capturing units, the focus position setting unit 2703 proceeds to step 2811. If there is an unprocessed image capturing unit, the focus position setting unit 2703 proceeds to step 2810.

In step 2810, the focus position setting unit 2703 updates the image capturing unit and returns to step 2804. The focus position setting unit 2703 repeatedly performs the process from step 2804 to step 2809 until the focus position setting is completed for all the image capturing units. In step 2811, the focus position controller 2705 controls the focus position of each image capturing unit on the basis of the focus positions set for the image capturing units, and then the process is completed.

In step 2803, the focus position setting unit 2703 selects the image capturing unit 101 as a first image capturing unit to which the focus position is set. However, the focus position setting unit 2703 may select another image capturing unit. The focus position setting unit 2703 may select the image capturing unit 109. In the changing process of the image capturing unit in step 2808, the image capturing unit may be changed in an order different from the order of numbers of the image capturing units. If the image capturing unit 109 is determined to be the first image capturing unit to which the focus position is set, the image capturing unit may be changed in descending order of the numbers of the image capturing units or may be changed in random order.

Further, in step 2804, the focus position setting unit 2703 sets the first object distance as the nearest distance in the distance calculation range. However, the first object distance is not limited to this distance. The focus position setting unit 2703 may set the farthest distance in the distance calculation range as the first object distance. In this case, in step 2806, the process is changed so that the front depth of field is set as the next object distance.

FIG. 29 shows the focus positions of the image capturing units 101 to 109 derived according to the process flow of FIG. 28 and the front and rear depths of field. The focus positions and the depths of field of the image capturing units 101 to 105 cover the set distance calculation range of 1 m to 3 m. The focus positions of the image capturing units 106 to 109 are set so that the image capturing units 106 to 109 further cover the distance calculation range covered by the image capturing units 101 to 105.

Figure 30:
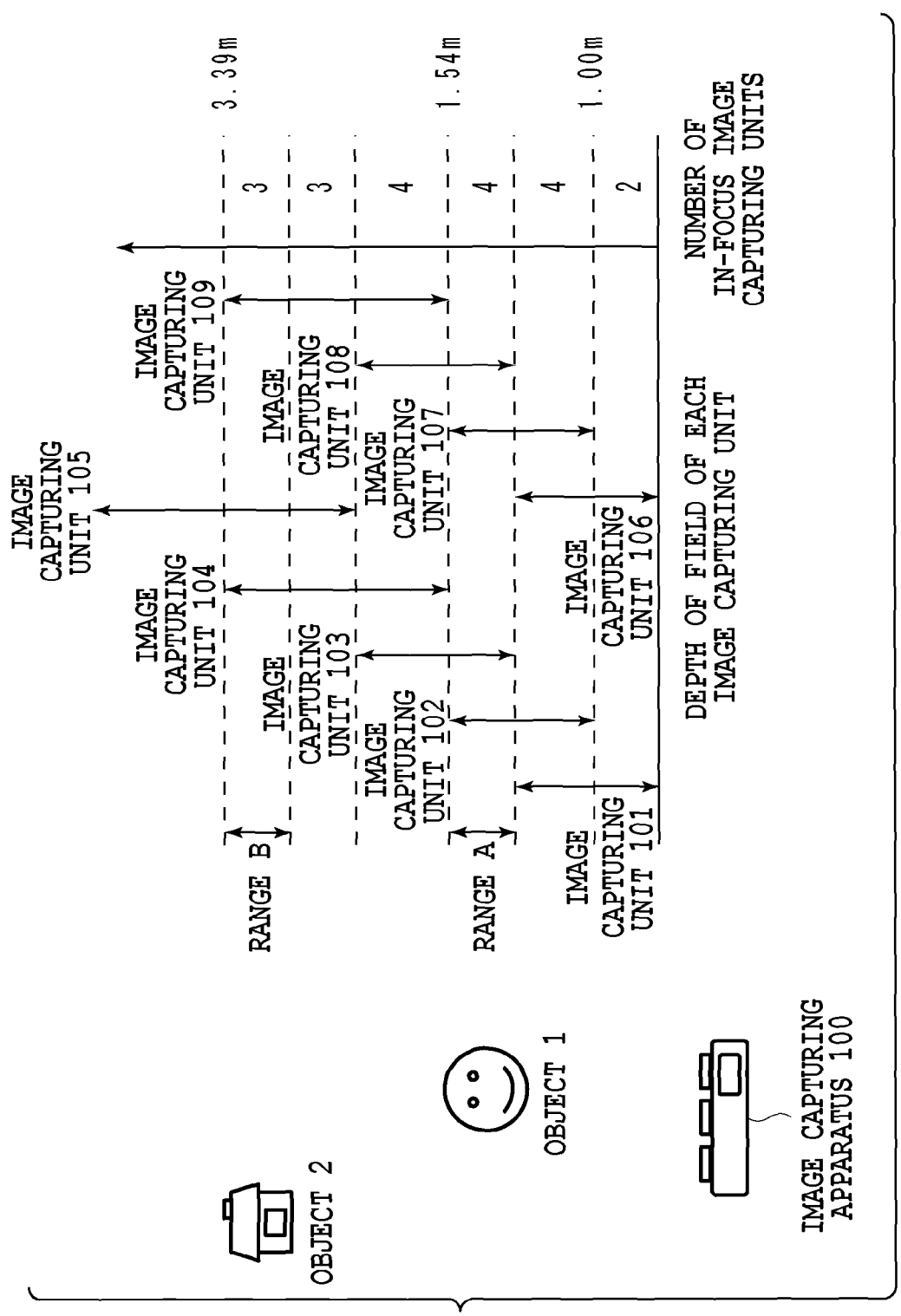
FIG. 30 is a diagram showing an example of a range of the depth of field of an image capturing unit according to the third embodiment.

FIG. 30 shows the ranges of the depth of field of the image capturing units and the number of image capturing units that are in a range of the depth of field and are in focus at each distance on the basis of the focus positions and the front and rear depths of field of the image capturing units 101 to 109 shown in FIG. 29.

In FIG. 30, the focus positions of the image capturing units are set so that a range A including the object 1 includes the depths of field of four image capturing units. Further, the focus positions of the image capturing units are set so that a range B including the object 2 includes the depths of field of three image capturing units.

On the other hand, in FIG. 23 of the first embodiment, the focus positions are set so that the depths of field of two image capturing units are included in the range A and the range B. By determining the distance calculation range, it is possible to capture an image of an object as an image in which much more image capturing units are in focus on the same object (an image in which the object is included in the depths of field). Therefore, it is possible to obtain a much more accurate range image.

As described above, according to the present embodiment, it is possible to provide a much more accurate range image by setting the focus positions of the image capturing units according to the distance calculation range.

(Fourth Embodiment)

In the first to the third embodiments, the image capturing apparatus includes image capturing units, each of which has lenses and a sensor. Next, an aspect in which sensors of the image capturing apparatus are integrated into one component will be described as a fourth embodiment. The description of the same components as those in the first to the third embodiments will be simplified or omitted, and, here, the differences from the first to the third embodiments will be mainly described.

Figure 31A:
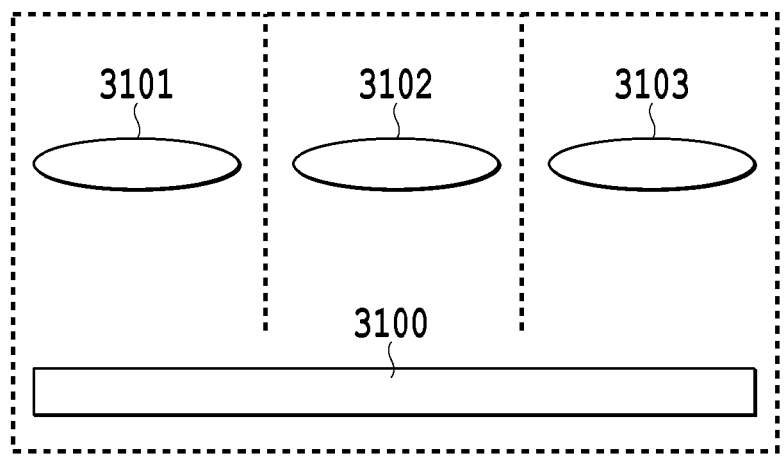
FIGS. 31A and 31B are diagrams showing an internal configuration of an image capturing unit according to a fourth embodiment.
Figure 31B:
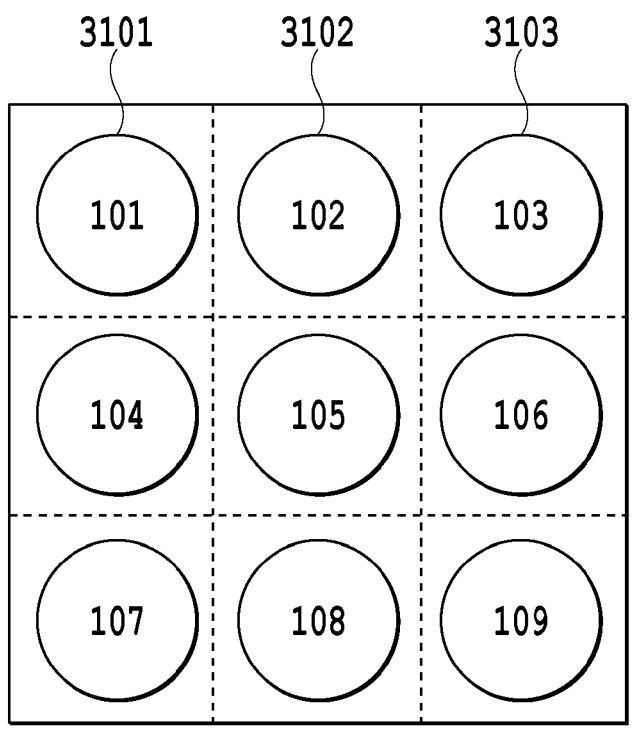

FIGS. 31A and 31B are diagrams showing an internal configuration of the image capturing apparatus. In the same manner as in FIGS. 3A and 3B, each of the image capturing units 101 to 109 includes lenses, an aperture, a shutter, an optical low pass filter, an iR cut filter, a color filter, a sensor, and an A/D converter. However, the configuration of the sensor is different.

A sensor 3100 is a sensor of the image capturing apparatus. Lenses 3101 to 3103 are lenses of the image capturing units 101 to 103. The sensor 3100 captures object images acquired by the image capturing units 101 to 109 by a single sensor. A single image captured by the sensor 3100 are associated with each image area captured by each image capturing unit and extracted as images captured by the image capturing units 101 to 109. Thereafter, the distance to the object is calculated by the image processing unit 212 according to the distance calculation method described above. By employing such a configuration, it is possible to further simplify the configuration of the image capturing apparatus.

As described above, according to the present embodiment, it is possible to provide a range image by a downsized image capturing apparatus.

(Another Embodiment)

The object of the present invention is also achieved by performing the process described below. A storage medium recording program code of software realizing the functions of the embodiments described above is supplied to a system or an apparatus and a computer (CPU, MPU, or the like) of the system or the apparatus reads the program code stored in the storage medium. In this case, the program code read from the storage medium realizes the functions of the embodiments described above, so that the program code and the storage medium storing the program code constitute the present invention.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-176117, filed Aug. 11, 2011, which is hereby incorporated by reference herein in its entirety.

What is claimed is:

1. An image acquisition apparatus comprising:
a first image capturing unit group including a plurality of image capturing units in which at least part of ranges of first depths of field overlap each other and acquiring a first image data group;
a second image capturing unit group including a plurality of image capturing units in which at least part of ranges of second depths of field overlap each other and acquiring a second image data group, the second depths of field being different from the first depths of field;
an in-focus image selection unit configured to calculate, for each of the first image data group acquired by the first image capturing unit group and the second image data group acquired by the second image capturing unit group, an area where angles of view of the plurality of image capturing units in each of the image capturing unit groups overlap each other and to select in-focus image data in the overlap area; and
a distance calculation unit configured to use the in-focus image data selected from the first image data group by the in-focus image selection unit to obtain a distance to a first object in images of the first image data group, and to use the in-focus image data selected from the second image data group by the in-focus image selection unit to obtain a distance to a second object in images of the second image data group, the second object being different from the first object,
wherein the in-focus image selection unit selects the in-focus image data for each sub-area obtained by dividing the overlap area, and
wherein the distance calculation unit calculates the distance to each object in the sub-area.

2. The image acquisition apparatus according to claim 1, wherein focal lengths of the plurality of image capturing units of the first image capturing unit group and the second image capturing unit group are the same.

3. The image acquisition apparatus according to claim 1, wherein the range of the depths of field in the first image capturing unit group and the range of the depths of field in the second image capturing unit group do not overlap each other.

4. The image acquisition apparatus according to claim 1, further comprising:
a setting unit configured to set a distance range in which a distance to an object is obtained; and a determination unit configured to determine the range of the first depths of field and the range of the second depths of field on the basis of the distance range which is set by the setting unit.

5. The image acquisition apparatus according to claim 1, further comprising
a determination unit configured to determine whether or not each of the sub-areas is an area in which a distance to an object is obtained,
wherein the distance calculation unit calculates a distance to the object in a sub-area, the sub-area being the area in which a distance to the object is obtained.

6. The image acquisition apparatus according to claim 5, wherein the determination unit is configured to determine whether or not the sub-area is an area in which a distance to the object is obtained based on a contrast value in the sub-area.

7. The image acquisition apparatus according to claim 1, further comprising a synthesis unit configured to synthesize a range image showing a distance to each object by using the first object distance data and the second object distance data calculated by the distance calculation unit.

8. The image acquisition apparatus according to claim 1, wherein the distance calculation unit is configured to obtain a distance to each object by obtaining a corresponding point in an image in each image data group acquired by each image capturing unit group.

9. An image processing method in an image acquisition apparatus having a first image capturing unit group including a plurality of image capturing units in which at least part of ranges of first depths of field overlap each other and a second image capturing unit group including a plurality of image capturing units in which at least part of ranges of second depths of field overlap each other, the second depths of field being different from the first depths of field, the method comprising the steps of:
calculating, for each of a first image data group acquired by the first image capturing unit group and a second image data group acquired by the second image capturing unit group, an area where angles of view of the plurality of image capturing units in each of the image capturing unit groups overlap each other and selecting in-focus image data in the overlap area; and
using the in-focus image data selected from the first image data group in the selecting step to obtain a distance to a first object in images of the first image data group, and using the in-focus image data selected from the second image data group in the selecting step to obtain a distance to a second object in images of the second image data group, the second object being different from the first object,
wherein, in the selecting step, the in-focus image is selected for each sub-area obtained by dividing the overlap area, and
wherein, in the step of obtaining a distance, the distance to each object in the sub-area is calculated.

10. A non-transitory computer readable storage medium storing a program for causing a computer to perform the control method according to claim 9.

* * * * *